US010614726B2

(12) United States Patent
Harkness

(10) Patent No.: US 10,614,726 B2
(45) Date of Patent: Apr. 7, 2020

(54) BEHAVIORALLY-BASED CRASH AVOIDANCE SYSTEM

(71) Applicant: Lifelong Driver LLC, Incline Village, NV (US)

(72) Inventor: Richard Harkness, Incline Village, NV (US)

(73) Assignee: LIFE LONG DRIVER, LLC, Incline Village, NV (US)

( * ) Notice: Subject to any disclaimer, the term of this patent is extended or adjusted under 35 U.S.C. 154(b) by 0 days.

(21) Appl. No.: 14/563,182

(22) Filed: Dec. 8, 2014

(65) Prior Publication Data

US 2016/0163217 A1 Jun. 9, 2016

(51) Int. Cl.
  G09B 9/052 (2006.01)
  G09B 5/06 (2006.01)
  G09B 7/00 (2006.01)

(52) U.S. Cl.
  CPC .............. *G09B 9/052* (2013.01); *G09B 5/06* (2013.01); *G09B 7/00* (2013.01)

(58) Field of Classification Search
  CPC ........ G09B 9/05; G09B 9/052; G09B 19/167; G09B 9/00; G09B 5/06; G09B 7/00
  USPC .......................................................... 434/65
  See application file for complete search history.

(56) References Cited

U.S. PATENT DOCUMENTS

| 3,777,413 A | 12/1973 | Zaccheo |
| 3,916,534 A | 11/1975 | Riccio |
| 4,486,180 A | 12/1984 | Riley |
| 4,500,868 A | 2/1985 | Tokitsu et al. |
| 4,750,888 A | 6/1988 | Allard et al. |
| 4,814,896 A | 3/1989 | Heitzman et al. |
| 4,846,686 A | 7/1989 | Adams |

(Continued)

OTHER PUBLICATIONS

Defensive Driving Strategies [online]. [retrieved on Aug. 8, 2016]. Retrieved from the Internet: <URL:http://web.archive.org/web/20040804230200/http://www.webtrafficschool.com/wts/content/Florida/Defensive_Driving_Strategies.html>. (webtrafficschool.com) Published Aug. 4, 2004.*

(Continued)

*Primary Examiner* — Jack Yip
(74) *Attorney, Agent, or Firm* — Amin, Turocy & Watson, LLP

(57) ABSTRACT

Described herein are a system and method of training a motor vehicle operator in crash-avoidance skills. Critical crash-avoidance skills comprise actively scanning a driving environment to identify, recognize, and remember what is seen; adjusting vehicle speed and position to accommodate road conditions, visibility, and traffic; proactively identifying and responding to potential hazards before the potential hazards become immediate hazards; recognizing, assessing, and responding to driving risks; creating a space cushion in order to identify and maintain possible escape routes; and identifying and minimizing visual, manual, and cognitive distractions. Training comprises at least one interactive driving simulation in which use of technology by a motor vehicle operator impacts performance of the motor vehicle operator. The training comprises computer-based learning tutorials, interactive point-of-view driving simulations, and conjoint experienced driver mentor/inexperienced trainee activities, as well as objective testing of motor vehicle operators on skills and driving knowledge.

22 Claims, 15 Drawing Sheets

(56) References Cited

U.S. PATENT DOCUMENTS

| | | | |
|---|---|---|---|
| 4,868,771 | A | 9/1989 | Quick et al. |
| 4,939,587 | A | 7/1990 | Deslypper |
| 4,952,152 | A | 8/1990 | Briggs et al. |
| 5,131,848 | A | 7/1992 | Adams |
| 5,184,956 | A | 2/1993 | Langlals et al. |
| 5,187,571 | A | 2/1993 | Braun et al. |
| 5,209,662 | A | 5/1993 | Fujita et al. |
| 5,253,107 | A | 10/1993 | Smith |
| 5,275,565 | A | 1/1994 | Moncrief |
| 5,344,324 | A | 9/1994 | O'Donnell et al. |
| 5,350,179 | A | 9/1994 | Hill et al. |
| 5,366,376 | A | 11/1994 | Copperman et al. |
| 5,474,453 | A | 12/1995 | Copperman |
| 5,486,112 | A | 1/1996 | Troudet et al. |
| 5,499,182 | A | 3/1996 | Ousborne |
| 5,613,032 | A | 3/1997 | Cruz et al. |
| 5,652,717 | A | 7/1997 | Miller et al. |
| 5,660,547 | A | 8/1997 | Copperman |
| 5,807,114 | A | 9/1998 | Hodges et al. |
| 5,813,863 | A | 9/1998 | Sloane et al. |
| 5,828,943 | A | 10/1998 | Brown |
| 5,888,074 | A | 3/1999 | Staplin et al. |
| 5,919,046 | A | 7/1999 | Hull |
| 5,954,510 | A | 9/1999 | Merrill et al. |
| 6,227,862 | B1 | 5/2001 | Harkness |
| 6,632,174 | B1 | 10/2003 | Breznitz |
| 6,927,694 | B1 | 8/2005 | Smith et al. |
| 8,323,025 | B2 | 12/2012 | Freund et al. |
| 8,576,286 | B1 | 11/2013 | Childs |
| 8,597,027 | B2 * | 12/2013 | Staplin ................ G09B 9/052 434/65 |
| 8,598,977 | B2 * | 12/2013 | Maalouf et al. ............ 340/3.1 |
| 2007/0015117 | A1 | 1/2007 | Freund et al. |
| 2007/0072154 | A1 | 3/2007 | Akatsuka et al. |
| 2007/0081262 | A1 | 4/2007 | Oizumi et al. |
| 2008/0108022 | A1 | 5/2008 | Freund |
| 2009/0011389 | A1 | 1/2009 | Sizov |
| 2009/0181349 | A1 | 7/2009 | Harkness |
| 2011/0076649 | A1 * | 3/2011 | Best ..................... G09B 9/05 434/69 |
| 2011/0076650 | A1 | 3/2011 | Best |
| 2014/0220513 | A1 | 7/2014 | Harkness |
| 2015/0104757 | A1 * | 4/2015 | Moncrief ............. G09B 9/302 434/38 |

OTHER PUBLICATIONS

Notice of Allowance for U.S. Appl. No. 13/286,210, dated Jan. 13, 2016, 28 pages.

Office Action for U.S. Appl. No. 11/972,512, dated Jan. 12, 2016, 65 pages.

Pollatsek, A; et al; "Using Eye Movements to Evaluate a PC-Based Risk Awareness and Perception Training Program on a Driving Simulator," Human Factors, 2006, vol. 48, No. 3, pp. 447-464.

"How is teenSMART Different?" teenSMART, http://www.teensmartdriving.com/how/, Available May 9, 2014, 3 pages.

"TeenSMART," ADEPT Driver, http://www.adeptdriver.com/products/teensmart/, Available May 9, 2014, 3 pages.

"What makes teenSMART successful?" teenSMART, http://www.teensmartdriving.com/what/, Available May 9, 2014, 3 pages.

"Why be a teenSMART Driver?" teenSMART, http://www.teensmartdriving.com/why/, Available May 9, 2014, 2 pages.

Berry, B., "ADEPT Driver Launches New Version of teenSMART to Kick Off National Distracted Driving Awareness Month," www.adeptdriver.com, Apr. 10, 2014, 2 pages.

International Search Report & Written Opinion for International Patent Application Serial No. PCT/US09/30765, dated Apr. 30, 2009, 6 pages.

Office Action for U.S. Appl. No. 11/972,512, dated Jul. 12, 2011, 17 pages.

Office Action for U.S. Appl. No. 11/972,512, dated Nov. 13, 2014, 36 pages.

Office Action for U.S. Appl. No. 11/972,512, dated Jul. 6, 2015, 32 pages.

Office Action for U.S. Appl. No. 13/286,210, dated Nov. 19, 2014, 17 pages.

Office Action for U.S. Appl. No. 13/286,210, dated Jul. 23, 2015, 24 pages.

Office Action for U.S. Appl. No. 11/972,512, dated May 18, 2016, 50 pages.

Office Action for U.S. Appl. No. 15/096,959, dated Jun. 1, 2016, 24 pages.

Notice of Allowance for U.S. Appl. No. 15/096,959, dated Jul. 20, 2016, 21 pages.

Office Action for U.S. Appl. No. 15/298,101, dated Aug. 7, 2017, 40 pages.

Office Action for U.S. Appl. No. 15/298,101, dated Dec. 27, 2017, 29 pages.

* cited by examiner

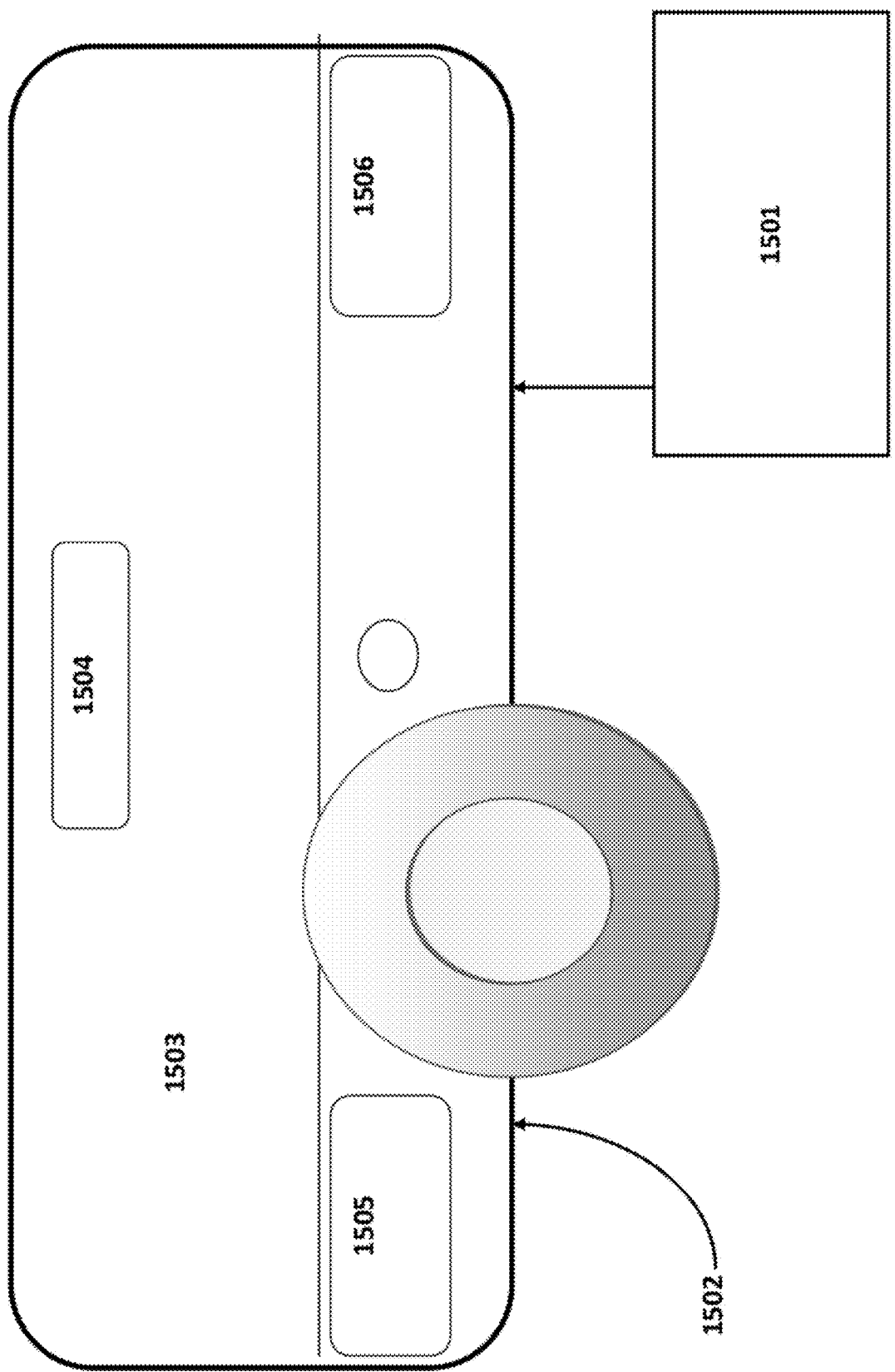

BEHAVIORALLY-BASED CRASH AVOIDANCE SYSTEM

BACKGROUND OF THE INVENTION

Field of the Invention

The present invention relates generally to systems and methods for training motor vehicle operators to drive safely, and particularly to minimize their risk being involved in a motor vehicle accident.

Description of the Prior Art

Various techniques, systems, and methods are available for providing driver education and training. Such training typically involves actual, behind-the-wheel driver training as at least one component. Such driver training may or may not be supplemented with classroom instruction.

FIG. 1 is a graph (compiled from data published by the National Highway Traffic Safety Administration in Traffic Safety Fact Sheets) showing crash rate as a function of experience. As shown in the figure, scientific research has shown that inexperienced drivers—regardless of age—have a much higher chance of being in collisions than more experienced drivers. As drivers gain more experience, crash rate decreases dramatically. Nevertheless, inexperienced drivers are more prone to be in collisions until they have amassed a decade or more behind the wheel. One reason for this long learning curve is that as drivers gain experience on the road, they learn to do things differently, see things differently, and think about things differently compared to inexperienced drivers.

Traditional driver education, however, has focused, not on teaching drivers how to see and think different, but on developing driver understanding of driving laws, teaching the consequences of driver errors (e.g., showing gruesome videos of vehicle crashes), and training drivers in the rules of the road through the use of driving simulators and/or supervised behind-the-wheel driving sessions. Notably, however, research indicates that there is little or no crash reduction benefit associated with this traditional rules-of-the-road-oriented driver education (see, e.g., Mayhew, D R et al. (2002), "The Safety Value of Driver Education and Training", *Injury Prevention*, 8 (*Supplement* 10:3ii-8). Since the subject content of typical driver education has never been subjected to content validity assessment in the context of crash reduction, it is not surprising that there has been little or no crash reduction benefit from such training.

When driving simulators are used, a steering wheel, brake, and accelerator are typically connected in a feedback loop such that under computer control, the image displayed varies as a function of the student's operation of the brake pedal, accelerator, and/or steering wheel. Additional views, such as left side views, right side views, and rear views may be provided within separate windows on the display device or using separate display devices in addition to views simulating a forward view.

Notwithstanding such training and education, there has not been a significant reduction in accidents of less experienced drivers over the years. This lack of success for prior art driver training techniques may be because traditional training programs cover numerous topics in a relatively superficial manner and without any particular focus. In addition, such traditional driver training is typically provided and/or required prior to licensing, so the training content tends to be focused on driving rules/laws and basic skills needed to pass the DMV's Driver's License test—rather than on acquiring skills and experience necessary to be a lifelong safe driver. Thus, while certain safety skills may be taught, there is typically little or no motivation for a new driver to acquire this necessary experience to enhance his/her safety skills until after licensing.

One exception to this general approach to driver training is disclosed in U.S. Pat. No. 6,227,862 (R. Harkness, "Driver Training System", issued May 8, 2001) which discloses a system and method for providing teenage drivers with training and education focused on various areas that address driving and lifestyle skills. The six areas addressed are i) lifestyle, ii) risk and benefit perception, iii) visual search, iv) speed adjustment, v) space management and vi) hazard recognition. This system is designed to address the driver training needs of teen drivers, the population of drivers having the highest accident rate in the United States.

Importantly, however, even U.S. Pat. No. 6,227,862 does not address the impact of manual, visual, and cognitive distractions while driving, nor does it teach drivers about the risks of using technological advances that are now becoming standard in all new vehicles. As one example, use of smartphones synchronized with vehicle audio systems now enable drivers to phone, message, and/or text with acquaintances—all of which are known to negatively impact a driver's attention and reaction time, as well as increase crash rate in both experienced and inexperienced drivers. As another example, navigation software for GPS guidance to selected locations (accessible via smartphones and/or via in-vehicle software) likewise negatively impacts a driver's attention and reaction time—and the risk of accidents Furthermore, crash-avoidance skills remain a critical issue for drivers even as they gain years of experience behind the wheel. As drivers become more experienced and secure in their prowess as drivers, personality styles can generate dangerous behavioral habits. For example, an aggressive person can become an aggressive middle-aged driver making risky decisions or engaging in risky behaviors such as darting in and out of traffic, exhibiting road rage, etc. Because middle-aged drivers are viewed as healthy and "in their prime", these drivers tend to not seek re-education opportunities to improve their driving skills and habits until after being ticketed, causing an accident, or being arrested. Even then, drivers may attend a traffic school, but do not tend to seek additional training in skills associated with being a safe and effective driver.

What is needed, then, is an improved system and method to provide experience to inexperienced motor vehicle drivers to teach these drivers how to minimize risks before they have an opportunity to develop that experience "on the road", and/or as a tool to hone the driving skills of more experienced drivers.

SUMMARY

In one embodiment is a method of training a motor vehicle operator in crash-avoidance driving skills, the method comprising the steps of (a) presenting to the motor vehicle operator by one or more audiovisual device a prerecorded training session designed to teach crash-avoidance driving skills to the motor vehicle operator, wherein (i) the training session comprises multiple modules focused on critical driving skills; (ii) at least one module comprises one or more interactive driving simulation presented through multiple active visual zones; and (iii) at least one interactive driving simulation comprises a scenario wherein use of technology by the motor vehicle operator impacts performance of the motor vehicle operator; (b) creating by the computing device a database for storing the recorded performance of the motor vehicle operator; (c) recording by a computing device performance of the motor vehicle operator in response to one or more events during each of the one or more interactive driving simulations of the training session; (d) storing by the computing device in the created database the recorded performance of the motor vehicle operator in response to each of the one or more events during each of the one or more interactive driving simulations of the training session; and (e) analyzing by the computing device the stored performance of the motor vehicle operator from at least one of the one or more interactive driving simulations of the training session to assess acquisition of the critical driving skills.

In another embodiment is a system for training a motor vehicle driver in crash-avoidance driving skills, the system comprising (a) one or more audiovisual device configured to present to the motor vehicle operator a prerecorded training session designed to teach crash-avoidance driving skills to the motor vehicle operator, wherein (i) the training session comprises multiple modules focused on critical driving skills; (ii) at least one module comprises one or more interactive driving simulations presented through multiple active visual zones; and (iii) at least one interactive driving simulation comprises a scenario wherein use of technology by the motor vehicle operator impacts performance of the motor vehicle operator; and (b) a computing device configured to (i) create a database for storing performance of the motor vehicle operator; (ii) record performance of the motor vehicle operator in response to one or more events during each of the one or more interactive driving simulations of the training session; (iii) store in the created database the recorded performance of the motor vehicle operator during each of the one or more interactive driving simulations of the training session; and (iv) analyze the stored performance of the motor vehicle operator in response to each of the one or more events from at least one of the one or more interactive driving simulations of the training session to assess acquisition of the critical driving skills.

In yet another embodiment is a non-transitory computing device readable medium having stored thereupon computing instructions for training a motor vehicle operator in crash-avoidance driving skills, the computing instructions comprising (a) a code segment to present to the motor vehicle operator by one or more audiovisual device a prerecorded training session designed to teach crash-avoidance driving skills to the motor vehicle operator, wherein (i) the training session comprises multiple modules focused on critical driving skills; (ii) at least one module comprises one or more interactive driving simulations presented through multiple active visual zones; and (iii) at least one interactive driving simulation comprises a scenario wherein use of technology by the motor vehicle operator impacts performance of the motor vehicle operator; and (b) a code segment to create by the computing device a database for storing performance of the motor vehicle operator; (c) a code segment to record by a computing device performance of the motor vehicle operator in response to one or more events during each of the one or more interactive driving simulations of the training session; (d) a code segment to store in the created database by the computing device the recorded performance of the motor vehicle operator in response to each of the one or more events during each of the one or more interactive driving simulations of the training session; and (e) a code segment to analyze by the computing device the stored performance of the motor vehicle operator in response to each of the one or more events from at least one of the one or more interactive driving simulations of the training session to assess acquisition of the critical driving skills.

BRIEF DESCRIPTION OF DRAWINGS

FIG. 15 is a block diagram of a system of training a motor vehicle operator in crash-avoidance skills according to one embodiment.

DETAILED DESCRIPTION OF THE INVENTION

Figure 1:
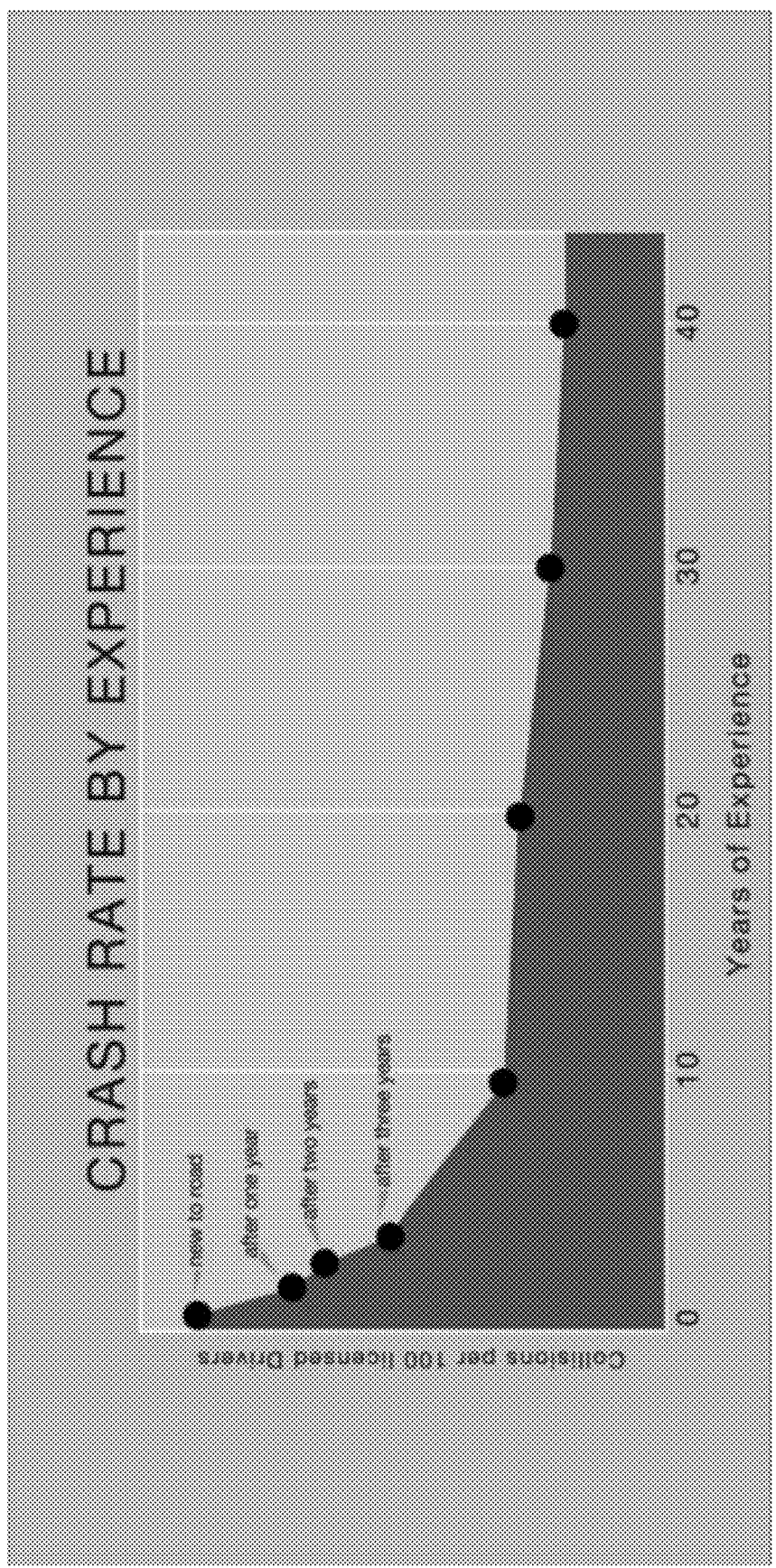
FIG. 1 is a graph of collision rate per 100 licensed drivers as a function of years of driving experience.

Described herein are various embodiments of a method and system whereby motor vehicle operators can be trained to reduce the probability that they will be involved in car accidents. As used herein, "motor vehicle operator" comprises motor vehicle drivers with little experience (e.g., student drivers), motor vehicle drivers with some experience (e.g., less than 5 years driving experience, e.g., new drivers such as teens or adults who recently acquired a training license or a new driver's license), motor vehicle drivers with less than 5 years experience driving a new type of vehicle (e.g., a car driver who is now transitioning to a new class of driving, e.g., to fleet driving) or a driver with greater than 5 years of driving experience who seeks to refresh his driving skills (e.g., to avoid accumulating points against his license as a result of a driving infraction). A motor vehicle operator participating in crash-avoidance training discussed herein is referred to herein as a "trainee". Various embodiments of the current invention focus on leading causes of crashes involving motor vehicle operators. These embodiments improve upon previous systems and methods for training motor vehicle drivers. The methods described herein detail a training program that encompasses computer-based learning tutorials, interactive point-of-view driving simulations, and conjoint experienced driver mentor ("mentor")/trainee activities, as well as objective testing of trainees on skills and driving knowledge. After training, the trainee has both the procedural and declarative knowledge to be a safer driver less prone to being in car accidents.

Embodiments of the method and system herein target leading causes of car crashes, many of which are ignored or addressed ineffectively in traditional "rules-of-the-road-oriented driver education. These embodiments are evidence-based, data-driven, and research-based, both in terms of content and the instructional technology used to deliver the training.

Embodiments of the method and system herein offer significant benefits over prior art systems, including that embodiments herein (1) address evaluating inherent, cumulative, and concurrent risk-taking behaviors, including the impact of manual, visual, and cognitive distractions while driving; (2) use psychometrics to quantify learning of escape route identification in real-time driving simulations; (3) address inattention blindness, brain function impairment, and/or redistribution of neuron activity as a result of cognitive distractions; (4) target and engage neurocognitive systems that assist in recall of objects in mirrors or blind spots; (5) offer distracted driving psychometrics and simulations that demonstrate the impact on hazard detection and safe driving; (6) address visual-cognitive recalibration that occurs when a driver glances back at a road after taking his eyes off the road; (7) address stopping distance increases associated with increased reaction times due to risky behaviors and/or distracted driving; and (8) measure trainee performance over time to determine skill growth, evaluate the predictive power of individual psychometrics, and/or conduct developmental evaluations of training effectiveness.

Embodiments of crash-avoidance training described herein are based on scientific studies that indicate that automobile accidents can be reduced by targeting driver skills using targeted neurocognitive psychometrics. That is, the training described herein measures human factors known to improve neural pathways associated with specific targeted crash-avoidance skills—e.g., knowing what's in a blind spot, spotting hazards faster with greater precision, judging safe traffic gaps, avoiding unsafe traffic gaps, assessing risk to evaluate driver environment, and improving visual search skills. These embodiments do not target the rules of the road per se, but rather address the root cause of accidents by teaching skills that are crucial to minimize risk of motor vehicle accidents and by providing practice and reinforcement of these skills. Driving scenarios capturing multiple angles of view (e.g., using multiple independent cameras positioned to capture multiple angles of view, using pannable cameras, or using a high definition digital action camera with a curved lens which allow a 360° panorama to be captured (e.g., Kodak™ Pixpro SP360 Action Cam)) are used to generate driving scenarios that mimic an actual driving environment in that a driver must simultaneously focus on information presented through multiple views (e.g., a front windshield, left and right side mirrors, and the rear-view mirror). These driving scenarios are presented to a trainee as interactive driving simulations in order provide the motor vehicle operator a safe environment in which to practice the critical crash avoidance skills. Trainee performance in response to events occurring in each simulation— including trainee reactions, reaction times, and/or accuracy—can be measured and recorded throughout the driving simulation. These responses can be compared to a trainee's previous performance as well as to a normalized database created from recorded performance of other trainees to provide timely assessment of the trainee's acquisition of critical skills as well as to provide feedback to the trainee.

Because it is well known that key agents can facilitate learning—both by providing a positive environment and by providing input on ways to acquire necessary experience, conjoint mentor/trainee activities (e.g., parent and teen driver, respectively) are used to engage those with a great deal of driving experience in the trainee's understanding of and acquisition of safe driving habits and skills.

Some advantages of crash avoidance training according to embodiments presented herein are that motor vehicle operators can be taught to see the driving environment inside and outside the vehicle differently, to think about driving hazards, risks, and lifestyle choices differently, and to make better critical decisions when driving.

Another advantage of driver training according to embodiments herein is that a trainee is provided with opportunities to learn from his/her mistakes. In some embodiments, feedback is provided after simulated driving events indicating whether performance responses by the trainee were "safe", "risky", "unsafe", or "missed". This feedback allows a trainee to build knowledge of not only how to drive safely, but also what behaviors result in risky or unsafe driving. Furthermore, when a trainee responds incorrectly during a simulated driving event, he is offered several options before being allowed to progress to a different module, including one or more of the following: (1) to repeat the exercise; (2) to view a tutorial with an explanation of how to judge the environment to perform correctly; (3) to be told what mistakes were made ("what did I miss") before repeating the exercise; and (4) to try again with help showing when and how to respond. Thus, the focus of the program remains on teaching an experienced driver how to drive safely . . . rather than on penalizing a driver for mistakes.

Other advantages of the embodiments described herein include explicit training to minimize driver distraction caused by advances in technology. For example, explicit training under simulated driving conditions is provided to demonstrate how texting, talking on a cell phone, using a car navigation system, using an internet browser, emailing, or social media, and/or relying on "self driving" or automated vehicle control systems during driving negatively impacts a driver's performance and increases the risk of negative consequences such as a car crash, injuries, financial damages, etc. Psychometrics are used to teach safe driving practices that discourage in-vehicle feature use (e.g., hands-free telephone, texting, and/or email). Embodiments herein also target new psychometrics that address challenges posed by and teach safe use of in-vehicle features such as lane assist with auto correction, lane departure warning, automatic following distance with automated deceleration/acceleration, back-up cameras and the like.

It is expressly contemplated that "black box" technology can be incorporated and integrated into embodiments of the crash-avoidance system and method herein. "Black box" technologies provide data on GPS position, g-force during acceleration, deceleration or turning, and/or vehicle speed. These systems connect with electronic systems of a vehicle to provide data on vehicle operation and/or driver performance to the motor vehicle operator or to a third-party (e.g., an insurance company). Behavior of an individual trainee (as captured by the in-vehicle "black box" monitoring system) can then be compared to large-scale normative data. Such comparisons can be used to determine if a trainee is speeding, driving aggressively, making jerky auto-corrections to maintain lane positioning, failing to come to a complete stop at traffic lights or signs, and/or other unsafe driver behaviors. In other embodiments, an in-vehicle camera can be used to assess a trainee's driving performance. These data can be used to provide feedback to the trainee (via text or email messages), used to determine an overall crash risk of an individual (e.g., for insurance pricing purposes), and/or used to determine program effectiveness. In some embodiments, biometrics can be used to determine driver stress, blood alcohol/drug monitoring, vehicle access, and/or drowsy driving.

Embodiments herein present a realistic driving simulation to the user to specifically train and assess a motor vehicle operator's abilities in quantifiable ways. Embodiments discussed herein are designed to maximize learning efficiency and increase driver retention of material being taught by cognitively engaging the motor vehicle operator. Once acquired, skills are reinforced to promote behavioral change and habit formation by a driver. These psychometrically-based driving simulations measure crash-avoidance behavior and develop/enhance neural pathways specific to the leading causes of car crashes.

In some embodiments, psychometrically-based realistic driving simulations are also used at the completion of the training described herein during a certification test to determine skill proficiency growth and to determine if neural pathways have been developed/enhanced during the training.

In some embodiments, Interactive driving simulations described herein utilize simultaneous prerecorded footage developed with a video-capture technology of a driving environment as described in U.S. patent application Ser. No. 13/286,210 (R. Harkness, filed on Oct. 31, 2011, "Senior Driver Training"), hereby incorporated herein in its entirety, using high-definition image video for clarity and contrast sensitivity, with an added benefit that response time can be measured with a resolution of $1/30$ of a second. Video capture technique uses multiple cameras to capture a front windshield view with a nearly 180 degree field of vision. This technology allows for seamless stitching of multiple camera images recorded from a front camera and side cameras directed to capture the driver and passenger window views. Using this technology, an approximately 120 degree full motion combination front view can be achieved, though adjustments to the cameras can be made to provide greater or lesser angled views, as necessary. Panable fields of views approaching 180 degrees—which are about as great as are practically necessary for most simulations—are achievable with this technology. In other embodiments, prerecorded footage of a driving environment can be developed with video-capture technology that captures multiple angles of view with one device, for example, by using a high definition digital action camera with a curved lens which allow a 360° panorama to be captured, such as (without limitation) the Kodak™ Pixpro SP360 Action Cam.

An expanded field of view is necessary to present certain driving situations that are particularly important to training and assessment of motor vehicle operators. Simulations described herein integrate multiple (e.g., 6) high-definition camera images and data compression, with images from three cameras overlapping into a panable front view, along with cameras for the two side mirrors and rear view mirror. Using a graphic user interface designed to allow for 6 (or more) camera functionality, in some ways similar to I-Max surround video, allows a psychometric assessment of gap analysis, visual cognition and hazard detection/divided attention, intensity of cognitive load, type of cognitive distraction, brain function impact on driver performance, and crash risk in motor vehicle operators.

In a preferred embodiment, the use of digital-frame based technology allows precise timing and very accurate comparisons of trainee reactions to the interactive simulations. Current digital camera and digital motion technologies are capable of capturing at least 1920 by 1080 pixels of data per frame, and at 30 frames per second. Alternatively, more traditional streaming video can be used with the system.

Embodiments herein present a realistic driving simulation to the user to specifically train and assess a motor vehicle operator's abilities in quantifiable ways. Embodiments discussed herein are designed to maximize learning efficiency and increase driver retention of material being taught by cognitively engaging the motor vehicle operator. Once acquired, skills are reinforced to promote behavioral change and habit formation by a driver.

The simultaneous and synchronized prerecorded footage is used for interactive driving simulations during training of crash-avoidance skills. In one embodiment, interactive driving simulations described herein utilize simultaneous prerecorded footage developed with a video-capture technology of a driving environment as described in U.S. patent application Ser. No. 13/286,210 (R. Harkness, filed on Oct. 31, 2011, "Senior Driver Training"), hereby incorporated herein in its entirety, using high-definition image video for clarity and contrast sensitivity, with an added benefit that response time can be measured with a resolution of $1/30$ of a second. In some embodiments, video capture technique uses multiple cameras to capture a front windshield view with a nearly 180 degree field of vision. This technology allows for seamless stitching of multiple camera images recorded from a front camera and side cameras directed to capture the driver and passenger window views. Using this technology, an approximately 120 degree full motion combination front view can be achieved, though adjustments to the cameras can be made to provide greater or lesser angled views, as necessary. Panable fields of views approaching 180 degrees—which are about as great as are practically necessary for most simulations—are achievable with this technology. In other embodiments, a single digital camera (e.g., Kodak™ Pixpro SP360 Action Cam) can be used to capture a 360° panorama of a driving environment.

An expanded field of view is necessary to present certain driving situations that are particularly important to training and assessment of motor vehicle operators. In one embodiment, simulations described herein integrate multiple (e.g., 6) high-definition camera images and data compression, with images from three cameras overlapping into a panable front view, along with cameras for the two side mirrors and rear view mirror. Using a graphic user interface designed to allow for 6 (or more) camera functionality, in some ways similar to I-Max surround video, allows a psychometric assessment of gap analysis, visual cognition and hazard detection/divided attention, intensity of cognitive load, type of cognitive distraction, brain function impact on driver performance, and crash risk in motor vehicle operators. In other embodiments, simulations described herein use images obtained with a high definition digital action camera with a curved lens which allow a 360° panorama to be captured (e.g., Kodak™ Pixpro SP360 Action Cam).

Referring now to FIG. 15, embodiments of a system described herein are capable of displaying prerecorded simultaneous and synchronized footage of a driving environment recorded from multiple cameras directed to four active visual zones comprising a driver's forward windshield view 1503, rear mirror view 1504, and a left side mirror view 1505 and a right side mirror view 1506, wherein the forward windshield view comprises a composite expanded view. This composite expanded view is compiled from a recorded forward windshield view and a view recorded from the driver's window. In this composite expanded view, driving events can be evaluated and assessed that are not presentable from a recording from a single forward-facing camera.

Embodiments of a system described herein to train motor vehicle operators in crash-avoidance use one or more audiovisual device 1501 and a computing device 1502. Audiovisual device 1501 is configured to present a trainee with prerecorded driving scenarios which are viewed by a trainee within a simulated driving environment (that is, the trainee is provided with a visual impression that he is driving a car within the realistic scene, and sees correspondingly accurate scenes through a front windshield 1503, a rear view mirror 1504, a left side mirror 1505, and a right side mirror 1506). To further simulate a driving environment, internal vehicle components such as a steering wheel, dashboard, sun visors, and the like are, in one embodiment, captured in prerecorded driving scenarios. As a prerecorded driver scenario progresses, scenes visible through the windshield and through each mirror change in corresponding fashions. Thus, for example, a trainee might see a white car ahead of him, a red car in a driving lane next to him and a blue car approaching from behind. As time progresses, the red car next to the simulated car might speed up and pass in front of the simulated car driven by the trainee but behind the white car (and thereby change position in the front windshield view) while the blue car approaching from behind might change lanes and enter a trainee's left side blind spot (and thereby temporarily disappear from all views until passing out of the trainee's left side blind spot). Audiovisual device 1501 can, but need not be, a computing device.

Computing device 1502 is configured to digitally measure and record a trainee's performance during each prerecorded driving scenario. Performance can be measured in a number of ways, including, without limitation, as accuracy of the trainee, reaction time of the trainee, actions of the trainee (e.g., mouse click or space bar tap to indicate a selection, as for example, on a quiz, or to identify an object on a screen), and/or qualitative assessment of a response (e.g., correct, incorrect, risky response, safe response, unsafe response, missed opportunity to response, late response, early response). Computing device 1502 is also configured to create a database in which the trainee's performance can be stored, store the trainee's performance in the database, and analyze the trainee's performance. In addition to analyzing the trainee's performance, computing device 1502 can be configured to compare the trainee's performance to the driver's prior performance (e.g., from a previous session) and/or to an existing database containing performance measures recorded from other inexperienced and/or experienced drivers. It is explicitly contemplated that an existing database containing performance measures recorded from other trainees and/or experienced motor vehicle operators is stored on a separate computing device or server with which computing device 1502 communicates over a wired or wireless network.

Computing device 1502 is also configured to provide computer-based training ("CBT"). Such computer-based training can include didactic instruction, module reviews and summaries, quizzes, interactive risk calculators, certification testing (all discussed further herein) and the like.

Audiovisual device 1501 and computing device 1502 can each be a personal computer, a laptop, or any communications-enabled mobile device with a user interface such as a smart television, a smart phone, a personal digital assistant (PDA), a media device (e.g., the iPod or iPod Touch from Apple, Inc), and electronic tablet (e.g., an iPad from Apple, Inc.), or an electronic reader device (e.g., a Kindle or Kindle DX from Amazon.com, Inc. of Seattle, Wash.). Audiovisual device 1501 has a display screen greater than 12 inches in preferred embodiments.

Figure 14:
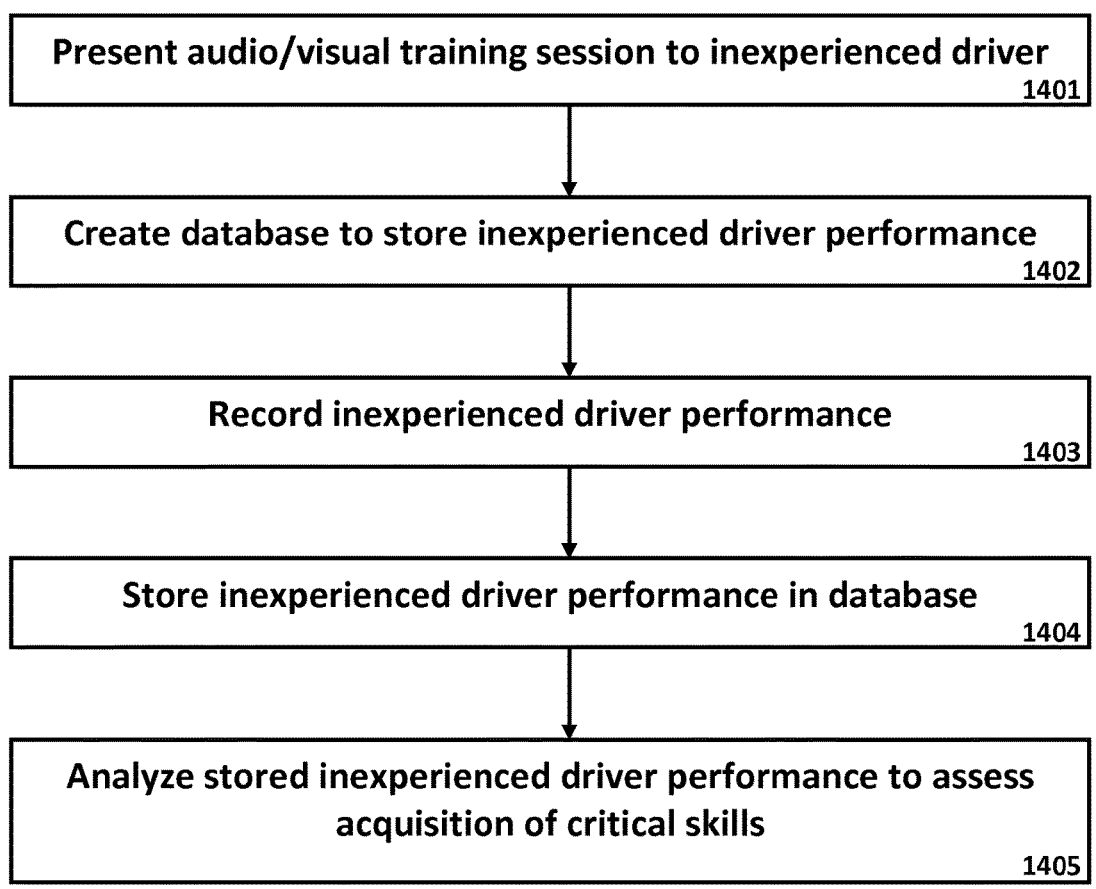
FIG. 14 is a flow diagram of a method of training a motor vehicle operator in crash-avoidance skills according to one embodiment.

Referring now to FIG. 14, one embodiment of a method of training a motor vehicle operator in critical skills to avoid crashes is shown. A training session preferably comprises a series of modules, with each module preferably focused on one or more critical driving skill. Critical driving skills comprise actively scanning a driving environment to identify, recognize, and remember what is seen, especially in mirrors and blind spots; adjusting vehicle speed and position to accommodate road conditions, visibility, and traffic; proactively identifying and responding to potential hazards before a potential hazard become an immediate hazard; recognizing, assessing, and responding to changes in driver risks (increasing risk, decreasing risk, or no change in risk); creating a space cushion while driving in order to provide a safe stopping distance so as to avoid crashing into another vehicle in front, or to the side or rear of a driver's vehicle; accurately judging safe gaps in traffic flow and decreasing the frequency of unsafe gap choices; scanning and assessing traffic and road conditions in order to correctly identify one or more safe escape routes to avoid a collision; using in-vehicle technology as a tool rather than a distraction, and identifying and minimizing visual, manual, and cognitive distractions while driving. As discussed further elsewhere herein, each module comprises various types of training, although, in a preferred embodiment, each module comprises at least one psychometric interactive driving simulation presented through multiple active visual zones.

In step 1401, audiovisual device 1502 is used to present to a trainee one or more prerecorded audiovisual training session designed to teach crash-avoidance skills. A training session comprises multiple modules, each focused on one or more critical driving skills. At least one module comprises one or more interactive driving stimulation presented through multiple active visual zones. In a preferred embodiment, at least one interactive driving simulation comprises a scenario wherein technology negatively impacts driving by a motor vehicle operator.

In step 1402, computing device 1502 creates a database in which to store performance of the trainee.

In step 1403, computing device 1502 records performance data from the trainee in response to one or more events during each of the one or more interactive driving simulations of the training session. Performance can be measured in a number of ways, including, without limitation, as accuracy of the trainee, reaction time of the trainee, actions of the trainee (e.g., mouse click or space bar tap to indicate a selection, as for example, on a quiz, or to identify an object on a screen), and/or qualitative assessment of a response (e.g., correct, incorrect, risky response, safe response, unsafe response, missed opportunity to response, late response, early response).

In step 1404, computing device 1502 stores in the created database the trainee's recorded performance data in response to each of the one or more events during each of the one or more interactive driving simulations of the training session.

In step 1405, computing device 1503 analyzes the trainee's stored performance data to assess the trainee's acquisition of skills critical for successful crash-avoidance.

Figure 2:
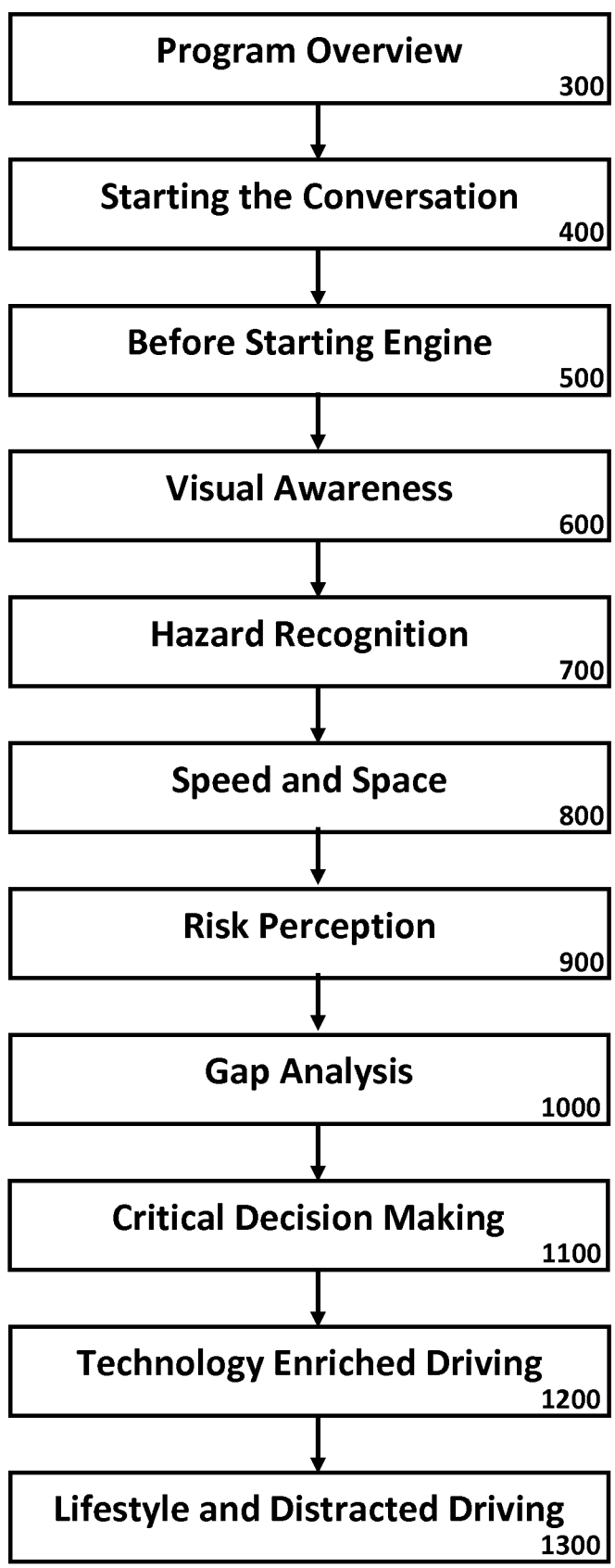
FIG. 2 is a flowchart depicting modules of a method of training a motor vehicle operator in crash-avoidance skills according to one embodiment.

One embodiment of an organization of modules dedicated to training critical skills in crash-avoidance within a training session is shown in FIG. 2. In a preferred embodiment, modules are ordered as follows: a Program Overview Module 300 (discussed further herein with respect to FIG. 3), a Starting the Conversation Module 400 (discussed further herein with respect to FIG. 4), a Before Starting Engine Module 500 (discussed further herein with respect to FIG. 5), a Visual Awareness Module 600 (discussed further herein with respect to FIG. 6), a Hazard Recognition Module 700 (discussed further herein with respect to FIG. 7), a Speed and Space Module 800 (discussed further herein with respect to FIG. 8), a Risk Perception Module 900 (discussed further herein with respect to FIG. 9), a Gap Analysis Module 1000 (discussed further herein with respect to FIG. 10), a Critical Decision Making Module 1100 (discussed further herein with respect to FIG. 11), a Technology Enriched Driving Module 1200 (discussed further herein with respect to FIG. 12), and a Lifestyle and Distracted Driving Module 1300 (discussed further herein with respect to FIG. 13). One of skill in the art will understand that the modules, and especially modules 600-1300, can be organized differently during a training session if desired.

FIGS. 3-12 show preferred embodiments for organization of training activities within each module. Training activities within each module need not occur in the order shown, and the modules need not be completed in the order presented herein. Each module will be discussed with reference to FIG. 2 and an appropriate corresponding FIG. 3, 4, 5, 6, 7, 8, 9, 10, 11, 12, or 13.

Figure 3:
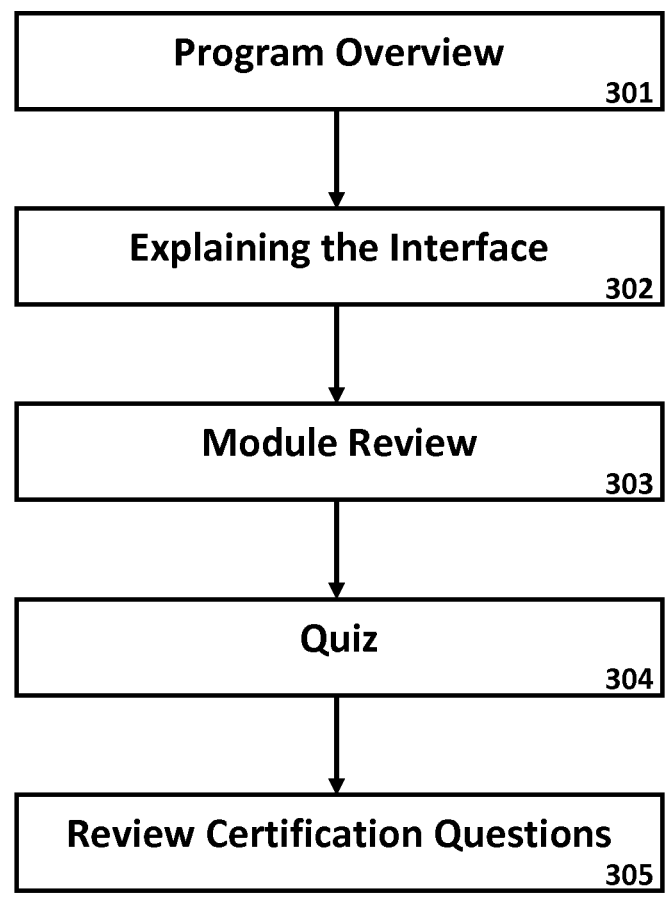
FIG. 3 is a flow diagram depicting a program overview module for a method of training a motor vehicle operator in crash-avoidance skills according to one embodiment.

Referring now to FIGS. 2 and 3, typical activities during an introductory Program Overview Module 300 according to one embodiment are shown. Program Overview Module 300 serves as an introduction to the crash-avoidance training program for a motor vehicle operator and typically comprises one or more of components Program Overview 301, Explaining the Interface 302, Module Review 303, Quiz 304, and/or Review Certification Questions 305.

Program Overview 301 typically comprises an audiovisual introduction to the training program which serves to introduce a trainee to reasons why a training program for motor vehicle operators was created, statistical data supporting a need for a training program targeted to motor vehicle operators, critical crash-avoidance skills that motor vehicle operators lack, activities in which the trainee will participate during a training session, how performance and progress of a trainee in acquiring the critical crash-avoidance skills will be assessed, and what a trainee will do differently when driving after completion of the training session(s).

Explaining the Interface 302 is typically an audiovisual explanation of how the graphic user interface of the training program works, and how a trainee can respond during activities.

Module Review 303 comprises a review of information presented during Program Overview Module 300. In one embodiment, information presented in Module Review 303 comprises: why the crash-avoidance training program was created; what more experienced drivers do that less experienced drivers do not; teaching methods and activities used in the crash-avoidance training program; what motor vehicle operators will do differently behind the wheel after completion of the crash-avoidance training program; and the benefits of completing the crash-avoidance training program.

Quiz 304 comprises a multiple choice quiz to assess comprehension of crucial information presented during Program Overview Module 300. In one embodiment, multiple choice questions are drawn (with or without replacement) from a database of relevant multiple choice questions. In one embodiment, a trainee must pass 75% of the questions in order to proceed to another module.

Review Certification Questions 305 comprises possible key points presented during Program Overview Module 300 that may be encountered on a multiple choice certification exam designed to assess understanding and acquisition of critical crash-avoidance skills at the conclusion of the training program.

Figure 4:
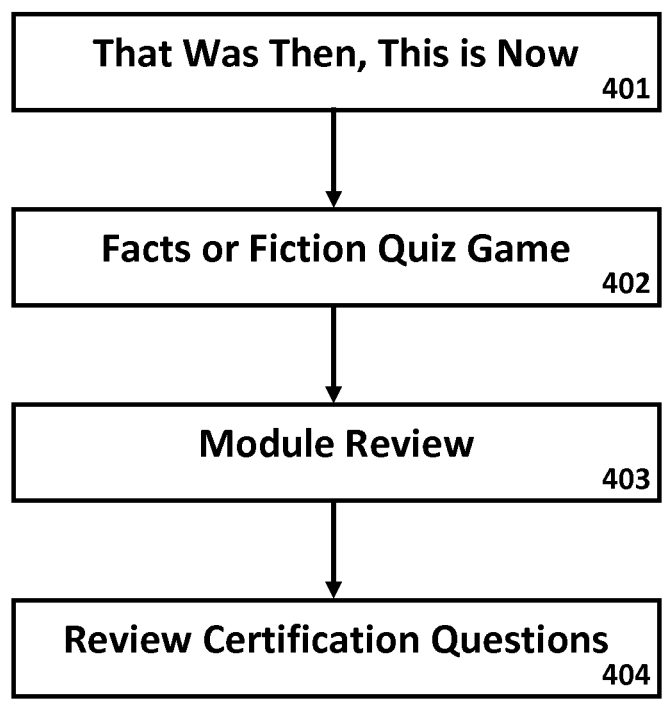
FIG. 4 is a flow diagram depicting a module for starting a conversation between motor vehicle operators and more experienced driver mentors according to one embodiment.

Referring now to FIGS. 2 and 4, typical activities during a Starting the Conversation Module 400 according to one embodiment are shown. Starting the Conversation Module 400 can be used to introduce a trainee to benefits of working with a mentor. In Starting the Conversation Module 400, both the trainee and a mentor are asked to participate in two or more on-screen activities: That Was Then, This Is Now 401 and Facts or Fiction Quiz Game 402.

On-screen activity That Was Then, This Is Now 401 comprises an audiovisual presentation to engage a trainee in a conversation with a mentor. In one embodiment, the trainee asks the mentor about his early driving experiences. The point of this exercise is to compare experiences to find out where trainees and mentors faced the same challenges behind the wheel when learning to drive, or where the challenges were different depending on time and location. For mentors, this is a chance to see if the trainee is facing any challenges unique to learning to drive today and to better understand the motor vehicle operator's point of view.

On-screen activity Facts or Fiction Quiz 402 comprises an examination of common stereotypes about motor vehicle operators. In one embodiment, a series of statements about motor vehicle operators and driving are presented and each participant (i.e., the trainee and the mentor) is asked to answer "Fact" or "Fiction" as quickly as he can. A narrator follows-up with the answers from experts. Examples of Fact or Fiction statements and expert answers used in one embodiment include:

FACT or FICTION: Teens must be safer because they have sharper and quicker reactions than most other drivers.
    This is Fiction. New drivers don't have the years of driving experience that it takes to make the most out of any sharper and quicker reactions they may have.
FACT or FICTION: Teens are reckless drivers because they like to take risks.
    This is a Fact. While many teens take the responsibility of driving seriously, the fact is that teens are inherently "at risk" for taking risks. There are social, psychological, lifestyle and brain chemistry factors at play. However, when teens learn how these factors interact to encourage risk taking, they are better prepared to make safer choices.
FACT or FICTION: When teens are involved in a serious collision, it is usually their fault.
    This is also a Fact. According to research, teens are much more likely to be responsible when they end up in a crash, usually because of driver error or speeding.
FACT or FICTION: The teen crash problem is caused just by young male drivers.
    This is Fiction. Female drivers have been closing the gap and their crash rate is very close to males.
FACT or FICTION: Teens are more likely to be distracted while driving.
    This is a Fact. Studies show that teens are more likely to talk on the phone, text, adjust audio systems, etc., more frequently than adults.
FACT or FICTION: Teens are more likely to drink and drive than adults.

This is Fiction. Adults are more likely to drink and drive. However, teens who drink and drive become even more impaired than adults who do so.

Module Review 403 comprises a review of information presented during Starting the Conversation Module 400. In one embodiment, information presented in Module Review 403 comprises: an explanation about why having a mentor to hand down knowledge, information, and advice about safe driving is important and an explanation of facts and fiction about motor vehicle operators.

Review Certification Questions 404 comprises possible key points presented during Starting the Conversation Module 400 that may be encountered on a multiple choice certification exam designed to assess understanding and acquisition of critical crash-avoidance skills at the conclusion of the training program.

Figure 5:
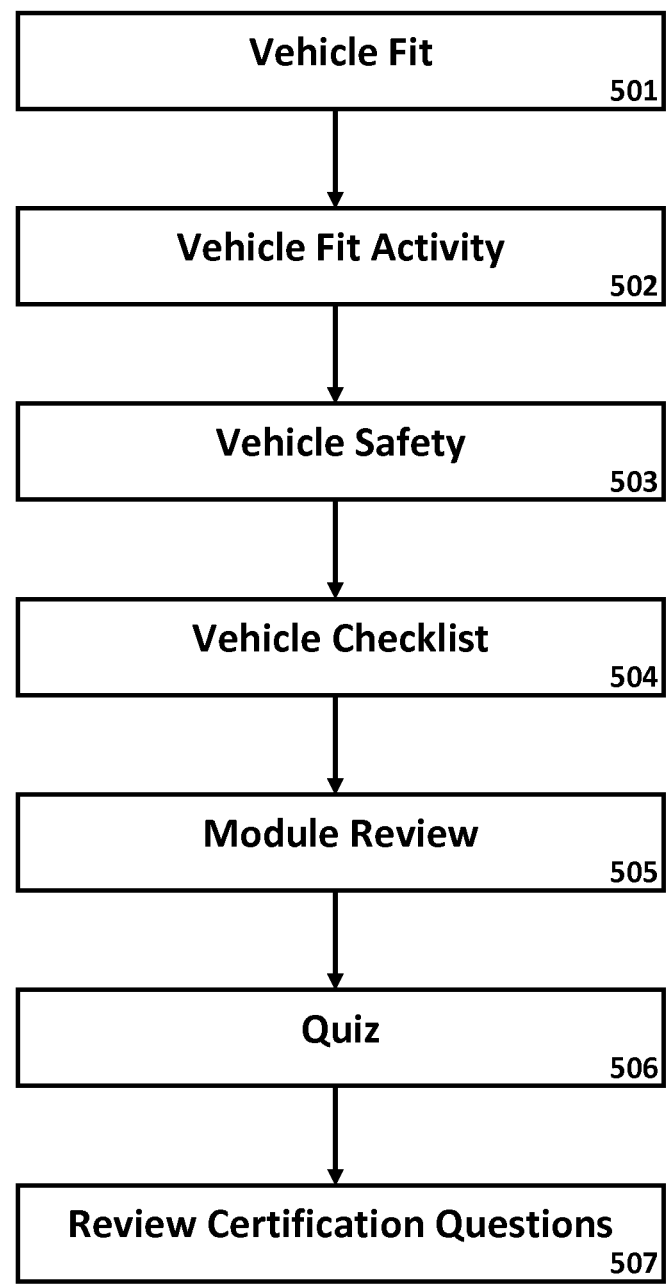
FIG. 5 is a flow diagram depicting a module for training pre-driving practices according to one embodiment.

Referring now to FIGS. 2 and 5, typical activities during a Before Starting Engine Module 500 according to one embodiment are shown. Before Starting Engine Module 500 can be used to instruct a trainee on how to customize car settings to ensure a safe driving experience. In Before Starting Engine Module 500, a trainee is asked to complete a computer-based Vehicle Fit Activity 502, watch a Vehicle Safety 503 computerized presentation, and complete a Vehicle Checklist 504.

Vehicle Fit 501 comprises instruction in how to customize a car's settings to ensure a safe driving environment. In one embodiment, a narrator explains reasons behind customized car settings such as mirror adjustments, seat and headrest adjustments and shows via an audiovisual presentation how to correctly customize vehicle settings.

Vehicle Fit Activity 502 comprises a computerized matching activity which tests whether the trainee has understood how to adjust seats, headrests, seatbelts, and steering wheels. The trainee is asked to pair correct car components (headrests, seatbelts, etc.) with statements reflecting a correct positioning of those components.

Vehicle Safety 503 comprises an audiovisual presentation of the correct use of braking systems (e.g., standard braking systems or antilock braking systems (ABS)). In one embodiment, Vehicle Safety 503 comprises an animation used to teach how to correctly use braking systems.

Vehicle Checklist 504 comprises a checklist to be used by the trainee to customize vehicle fit for a safe drive. The checklist allows the trainee to work with a mentor to correctly adjust his own vehicle for safe driving.

Module Review 505 comprises a written review of critical information presented within Vehicle Fit Module 500, including, in one embodiment: adjust a driver's seat, adjust a steering wheel, adjust a headrest, adjust a seatbelt, adjust mirrors (rearview mirror 1504, left side mirror 1505, and right side mirror 1506), determine if mirrors are correctly adjusted, and brake correctly depending on whether an Antilock Braking System (ABS) or standard braking system is installed on a car. In various embodiments, correct usage of, and potential problems caused by technology-assisted driving (e.g., use of navigation systems (e.g., Global Positioning Satellite (GPS)), back-up cameras, blind spot indicators, lane-departure warnings, electronic stability control mechanisms, safety belt load limits and pretension, advanced frontal airbags, advanced side airbags and curtains, steering controls, etc.) is presented.

Quiz 506 comprises a multiple choice quiz to assess comprehension of crucial information presented during Vehicle Fit Module 500. In one embodiment, multiple choice questions are drawn (with or without replacement) from a database of relevant multiple choice questions. In one embodiment, a trainee must pass 75% of the questions in order to proceed to another module.

Review Certification Questions 507 comprises possible key points presented during Vehicle Fit Module 500 that may be encountered on a multiple choice certification exam designed to assess understanding and acquisition of critical crash-avoidance skills at the conclusion of the training program.

Figure 6:
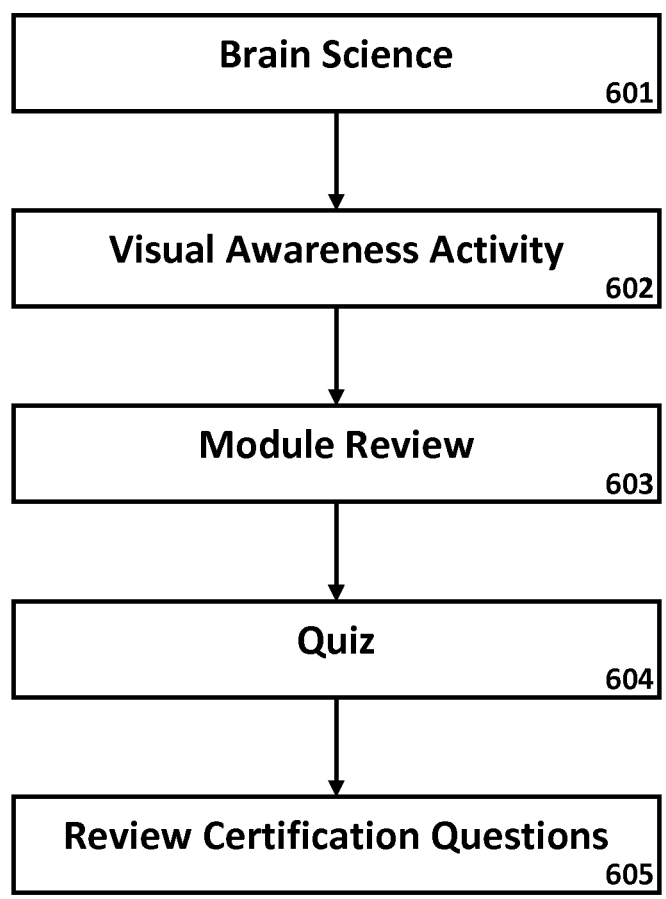
FIG. 6 is a flow diagram depicting a module for training visual awareness according to one embodiment.

Referring now to FIGS. 2 and 6, typical activities during a Visual Awareness Module 600 according to one embodiment are shown. In Visual Awareness Module 600, a trainee is instructed in how to be and remain visually aware of a driving environment. Brain Science 601 comprises an audiovisual presentation used to inform and instruct a trainee on important information about visual awareness, including that the number one cause of accidents is a failure to see other vehicles; that inexperienced motor vehicle operators are more likely to be less visually aware than more experienced drivers; that practicing visual scanning, recognizing, and remembering can increase visual awareness search skills as well as develop/enhance neural pathways in areas of a driver's brain specific to crash-avoidance behavior (e.g., visual cognition and memory); that an active visual search means a driver is constantly moving his eyes to search around his vehicle and constantly filter outs irrelevant information to deal with relevant information so the driver has plenty of time to react to changing situations; and that a driver should engage in active visual search of areas both near his current position and about 15 seconds ahead of his current position (i.e., where he is about to be).

Visual Awareness Activity 602 comprises one or more psychometrically-based interactive simulation activities designed to develop/enhance neural pathways in areas of a driver's brain specific to crash-avoidance behavior (e.g., visual cognition and memory) and heighten a trainee's visual awareness and provide the trainee practice in active visual search techniques in a variety of driving scenarios. In one embodiment, visual awareness is assessed under different levels of cognitive loads associated with the driving scenario and/or different levels of complexity of the requisite task. For example, the cognitive load on a driver in a residential area with little activity and with little traffic that is slow moving is low, whereas the cognitive load on the driver in a high activity urban area on a multilane road with heavy, faster moving traffic, tailgaters, and pedestrians at congested intersections is higher. In one embodiment, Visual Awareness Activity 602 comprises one or more cognitive load levels, each with two or more simulated driving scenarios. In another embodiment, the complexity of the visual awareness and memory task is increased by asking the trainee to identify up to three objects within the driving scenario. For example, the trainee can be asked where the white pickup truck is (answer: in the right blind spot), where the bicyclist (answer: in front of the vehicle), and where the motorcycle is (answer: in the left side mirror). In some embodiments, a trainee must successfully complete a pre-established number of these simulated driving scenarios to progress to a new module.

In preferred embodiments, four active visual zones are presented to the trainee by computing device 1501 and trainee actions/responses in response to events during the simulated driving scenarios are digitally measured. Performance (e.g., response times, accuracy, and/or the number of missed responses) is assessed and recorded.

In one embodiment, a simulated driving scenario is typically presented showing four image zones in a split screen system on a display screen. The visible image zones in the four camera field of view include (1) a front windshield image zone which includes everything visible through a vehicle front windshield and occupies a full display screen (except for spaces reserved for three small rectangular shaped images that appear to have a chrome border); (2) a left side mirror image zone shown as a chrome-framed rectangular image in the lower left corner of the screen which includes everything visible through a vehicle's left side mirror; (3) a right side mirror image zone shown as a chrome-framed rectangular image in the lower right hand corner which includes everything visible through a vehicle's right side mirror; and (4) a rear mirror image zone shown as a chrome-framed rectangular image in the upper center of the screen which includes everything visible through a vehicle's rear view mirror. Each mirror image zone depicts its own scene recorded and time-synchronized to run simultaneously with the main screen windshield view.

In a preferred embodiment, blind spots exist as when driving an actual motor vehicle. A right blind spot zone is everything to the right of the car that cannot be seen in the front view, rear view, or right side mirror zones. A left blind spot represents the zone to the left of the car that cannot be seen in the front view, rear view, or left side mirror zones. Thus, as a scene progresses, scenery, pedestrians, signal lights, etc. pass through image zones as if the driving simulation were actually occurring—i.e., each driving simulation is a realistic portrayal of a drive in a motor vehicle.

Objects are constantly moving in and out of these blind spots during the full motion video scenarios, just as in real world driving. The presentation of real world transitions among and between visible and blind spot zones permits a series of questions to be asked of the trainee. The trainee at all times is expected to track and to know what is in the blind spots, and what is not there.

For example, in one driving scenario, a trainee is asked to "drive" in the simulation while attending to everything going on around him such as where other vehicles are. The audiovisual presentation is then paused, and the trainee is asked about where a certain object is in relation to a motor vehicle operator's car, e.g., "Where is the white pickup truck now?" and the truck was slowly passing on the right and had just disappeared from the right rear mirror, the driver would respond; "in the right blind spot zone", even though the truck is not presently visible on the computer screen. Cognitive load can be increased by adding more objects in different zones to which the trainee must attend in the driving scenario. Complexity of the task can be increased by asking the trainee to recall the location of more than one object in the driving scenario when the driving scenario is paused. In another embodiment, a trainee is asked to identify an escape path when the driving scenario is paused. If, e.g., no cars had been drifting in or out of the blind spot or right rear view mirror or ahead and immediately to the right of the vehicle, then the trainee could recognize that the right blind spot zone is clear and identify that route as a good escape path.

After the trainee responds appropriately to the inquiry (e.g., by clicking an appropriate zone), feedback is provided by computing device 1501. Feedback comprises a number of mistakes. Mistakes comprise identifying an incorrect zone. If the trainee makes an error, he is provided with an option to view a tutorial or rerun the driving scenario with narrative explaining what was missed. After completing one of those options, the trainee is presented with an option to again see the tutorial, again rerun the driving scenario with narrative explaining what was missed, or try the driving scenario again.

In one embodiment, one or more driving scenarios are presented. The one or more driving scenarios can be simulated driving on a residential street, on a freeway, in a parking lot, on a city street, in a freeway merge lane, or otherwise.

In one embodiment, a trainee is asked to complete one or more levels of differing complexity and/or one or more levels of cognitive load in the visual awareness task before being permitted to proceed to Module Review 603. For example, at one level the trainee may be tasked to identify the location of one object of interest (e.g., one car, or a pedestrian), while at another more complex level the trainee may be tasked to identify the location of more than one object of interest (e.g., a bicyclist and a purple car, or a white car and a semi-truck).

In some embodiments, Visual Awareness Activity 602 can be supplemented with a visual search and memory exercise during additional driving practice with a mentor in an actual motor vehicle. This supplemental activity is designed to allow a trainee to practice critical visual awareness skills, to wit: to be visually aware of what is going on around the driver as he drives; to scan 360 degrees around the driver's vehicle while driving; and to remember where objects are located when prompted. For this exercise, the trainee is asked to provide commentary as he drives, on what is in six zones around the vehicle: a forward front view, a behind rear view, a left side mirror view, a right side mirror view, a left blind spot area, and a right blind spot area. For example, a driver might say "I am passing a car on my right and they just passed into my right blind spot. I should be able to see the car in my right mirror soon." Or "I see traffic starting to bunch up a quarter mile up the highway." During the drive, the mentor is asked to be an observer and, when it is safe to do so, to question the motor vehicle operator about where certain objects are (e.g., a red truck, a bicyclist, a pedestrian). Responses are charted for further discussion after the drive. During the activity, the trainee is instructed to focus on driving safely, to glance rather than to stare into mirrors, and to choose safe times to look in mirrors. The mentor is provided with guidelines for being an observer (e.g., wait until you are out of the car before giving feedback, begin by saying two or three positive things about what the trainee did right, ask the trainee for his take on what went well and what didn't go so well, concentrate on two or three things the trainee can improve, focus feedback on driving skills or on how the mentor felt during the drive, and end on a positive note). In one embodiment, the trainee and the mentor switch roles so that the mentor drives while the trainee acts as an observer tasked with providing feedback.

Module Review 603 comprises a written review of critical information presented within Visual Awareness Module 600, including, in one embodiment: the importance of using an active visual search (in which the driver constantly moves his eyes to look around as he drives, recognizes what he sees, and remembers what he sees), filtering out unimportant or irrelevant information, and looking about 15 seconds ahead of where a driver currently is in order to know what's going on where a driver is now and where the driver is about to be.

Quiz 604 comprises a multiple choice quiz to assess comprehension of crucial information presented during Visual Awareness Module 600. In one embodiment, multiple choice questions are drawn (with or without replacement) from a database of relevant multiple choice questions. In one embodiment, a trainee must pass 75% of the questions in order to proceed to another module.

Review Certification Questions 605 comprises possible key points presented during Visual Awareness Module 600 that may be encountered on a multiple choice certification exam and/or psychometric assessment using driving simulations, both designed to assess understanding and acquisition of critical crash-avoidance skills at the conclusion of the training program.

Figure 7:
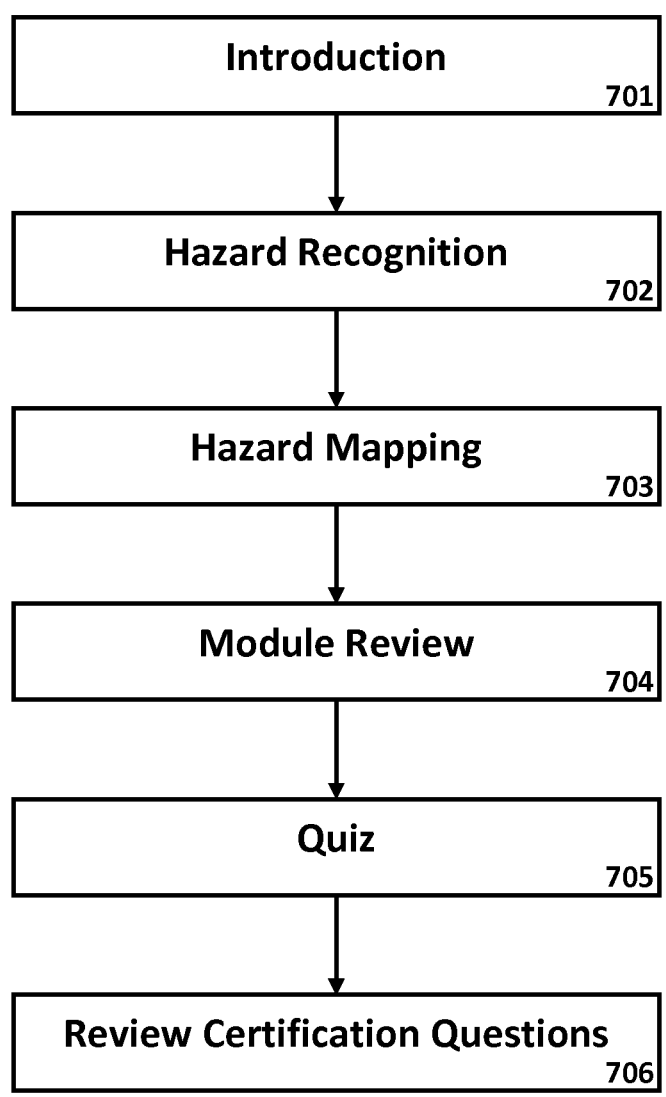
FIG. 7 is a flow diagram depicting a module for training hazard recognition according to one embodiment.

Referring now to FIGS. 2 and 7, typical activities during a Hazard Recognition Module 700 according to one embodiment are shown. In Hazard Recognition Module 700, a trainee is instructed how to identify and respond to driving hazards. Introduction 701 comprises an audiovisual presentation used to inform and instruct a trainee on important information about hazard recognition, including: identifying three types of hazards (immediate hazards that affect driving now, potential hazards that might affect driving in the near future, and inanimate objects of interest that should be recognized and reacted to appropriately to drive safely); ways to facilitate hazard identification such as applying an active visual search technique, being vigilant in places and situations likely to contain hazards (e.g., intersections, near home) and filtering out irrelevant information; and why hazard recognition is important (so as to be able to spot and respond to potential hazards before they become immediate hazards).

Hazard Recognition 702 comprises one or more interactive simulation activities designed to heighten a trainee's recognition of hazards and provide the trainee practice in identifying hazards in a variety of driving scenarios. In one embodiment, hazard recognition is assessed under different levels of cognitive load associated with the driving scenario and/or different levels of complexity of the requisite task. Cognitive load can be classified into levels ranging from low to high cognitive load. For example, the cognitive load on a driver in a residential area with little activity and with little slow-moving traffic is low, whereas the cognitive load on the driver in a high activity urban area on a multilane road with heavy, faster moving traffic, tailgaters, and pedestrians at congested intersections is higher. In one embodiment, the interactive simulation comprises one or more cognitive load levels, each with two or more simulated driving scenarios. In another embodiment, the complexity of the task is increased by asking the trainee to identify up to three hazards within the driving scenario. For example, the trainee can be asked to identify all the potential hazards in the driving scenario which might include a pedestrian in the crosswalk immediately in front of the vehicle, a bicyclist approaching the driver's left blind spot in the left side mirror, and a tailgating motorcycle visible in the rear view mirror. In some embodiments, a trainee must successfully complete a pre-established number of these simulated driving scenarios to progress to a new module.

The simulated driving scenarios are similar to those discussed elsewhere herein (e.g., as discussed with reference to Visual Awareness Activity 602), except that the trainee is tasked with clicking on hazards as they appear during a driving scenario. Again, however, in one driving scenario, a trainee is asked to "drive" in the simulation while attending to everything going on around him such as where other vehicles and/or pedestrians are. In one embodiment, a trainee is tasked with increasingly difficult hazard identification tasks under increasing cognitive loads as the trainee progresses through successive interactive driving scenarios. Thus, for example, a trainee is tasked in one driving scenario with identifying one factor such as pedestrians who pose a potential hazard or tasked in a succeeding driving scenario with identifying vehicles that pose a potential hazard. Complexity is varied by varying the number and/or type of hazards to be identified in any one driving scenario, such as identifying people and vehicles and/or traffic signage which pose potential hazards. These psychometric assessments are designed to develop/enhance neural pathways in areas of a driver's brain specific to quickly identifying hazards and avoiding car crashes.

After each simulated driving scenario has concluded, computing device 1501 displays the number of hazards missed. If hazards were missed, the trainee is provided an opportunity to try the same simulated driving scenario again with help (e.g., with hazards highlighted on the display in some manner). If no hazards were missed, the trainee can proceed to the next simulated driving scenario. Once a predetermined sufficient number of simulated driving scenarios have been successfully completed, the trainee can proceed to the next activity.

Hazard Mapping 703 comprises an additional driving practice exercise for a trainee with a mentor in an actual motor vehicle. This activity is designed to allow a trainee to practice recognizing and dealing with hazards on the road in order to reduce the risk of crash. In this activity, a trainee plots a driving route and discusses with the mentor anticipated hazards (e.g., busy intersections, lane reductions, road construction, poor road conditions, etc.) on the route. As the trainee drives, the mentor is tasked with logging immediate or potentially hazardous situations identified by the trainee. The mentor can also log the trainee's comments about encountered hazards. After the drive, the trainee and the mentor refer to these notes to identify strategies for dealing with each hazardous or potentially hazardous situation in a better and safer way (e.g., slowing down, moving into another lane, using a different route) to minimize danger.

Module Review 704 comprises a written review of critical information presented within Hazard Recognition Module 700, including, in one embodiment: how to use active visual search techniques to identify immediate hazards that will affect driving now, potential hazards that might affect driving soon, and inanimate objects of interest (e.g., speed signs, stop signs) to which a driver should react appropriately in order to drive safely, and how to react smoothly and safely to potential hazards before they become immediate hazards.

Quiz 705 comprises a multiple choice quiz to assess comprehension of critical information presented during Hazard Recognition Module 700. In one embodiment, multiple choice questions are drawn (with or without replacement) from a database of relevant multiple choice questions. In one embodiment, a trainee must pass 75% of the questions in order to proceed to another module.

Review Certification Questions 706 comprises possible key points presented during Hazard Recognition Module 700 that may be encountered on a multiple choice certification exam and/or psychometric assessment using driving simulations, both designed to assess understanding and acquisition of critical crash-avoidance skills at the conclusion of the training program.

Figure 8:
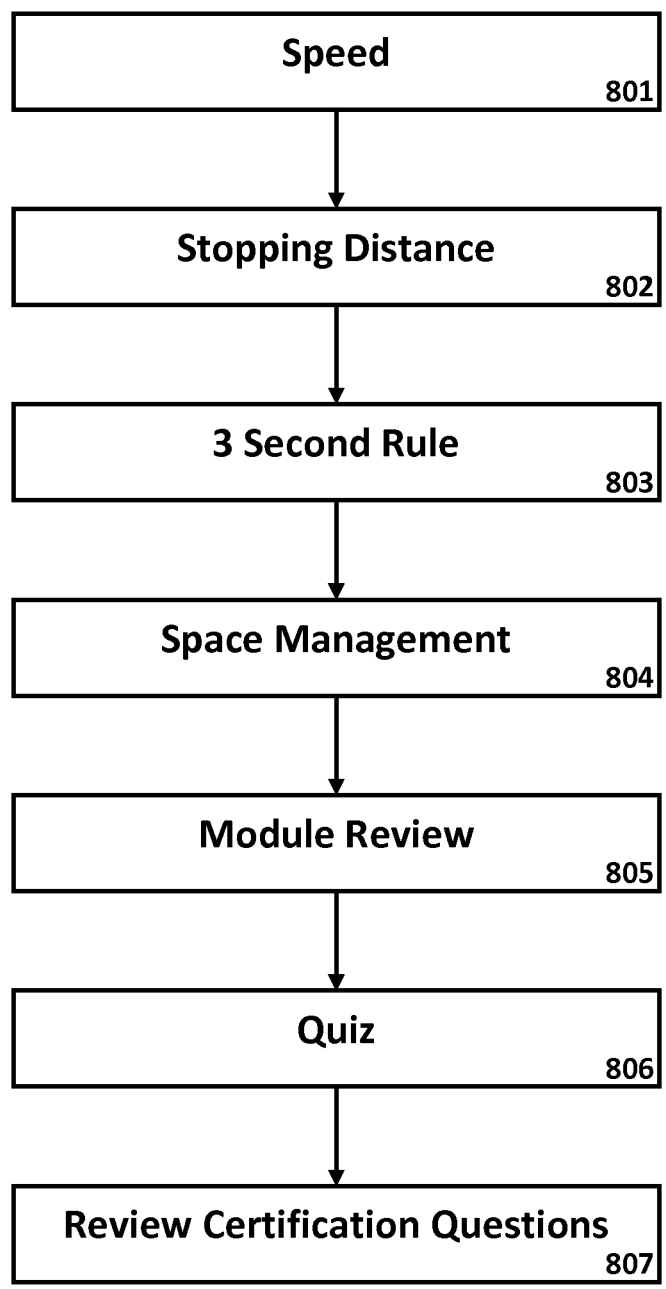
FIG. 8 is a flow diagram depicting a module for training speed and space management according to one embodiment.

Referring now to FIGS. 2 and 8, typical activities during a Speed and Space Module 800 according to one embodiment are shown. In Speed and Space Module 800, a trainee is instructed about how to manage speed of his vehicle and space around his vehicle to avoid accidents. Speed 801 comprises an audiovisual presentation used to introduce, inform and instruct a trainee on important information about speed and space management, including: that speed is the second leading cause of crashes; that traffic flow research shows speeding up and tailgating doesn't get one to a destination any faster; that the risks of speeding (potential accidents, injuries, or death) are greater than the rewards of speeding (arriving at a destination a few minutes sooner); that speed is relative—that is, a driver is more likely to get into trouble going 10 miles faster than the traffic flow at a lower speed (e.g., traveling 35 m.p.h. when traffic is flowing at 25 m.p.h.) than when traveling with the traffic flow at a higher speed (e.g., traveling 65 m.p.h. in a 65 m.p.h. traffic flow); that road conditions, sight distance, and traffic conditions determine how fast one should drive; that sight distance is determined by how fast a vehicle is traveling and how far in advance of the vehicle a driver can see; and that a driver should be able to see the spot at which car will come to a stop given the vehicle's speed.

Stopping Distance 802 comprises an audiovisual presentation illustrating how stopping distance is determined and how speed, road conditions, road type (e.g., asphalt, gravel, etc.), and coefficient of friction between the vehicle tires and the road affect stopping distance. The audiovisual presentation is designed to emphasize four key points: (1) that the laws of physics cannot be cheated—so a vehicle will not stop any faster than it is designed to stop based on road conditions; (2) that dry road stopping performance is not achievable when the road is not dry; (3) that doubling a vehicle's speed doubles a driver's reaction distance; and (4) that increasing speed from 30 m.p.h. to 60 m.p.h. quadruples braking distance. In various embodiments, the audiovisual presentation comprises actual video footage of a driver under controlled conditions receiving a cue to brake, braking, and bringing a vehicle to a full stop supplemented with one or more illustration and/or animation demonstrating (1) how reaction distance is measured (from the point at which a cue to brake is given until the point at which the foot has been moved to apply pressure to the brakes); (2) how reaction time and distance traveled before applying breaks is impacted by distracted driving; (3) how braking distance is measured (from the point at which pressure is applied to the brakes until the vehicle comes to a complete stop); and (4) how vehicle stopping distance is determined (by adding reaction distance to breaking distance). In preferred embodiments, the audiovisual presentation further comprises how breaking distance and vehicle stopping distance under non-optimal (e.g., wet, snowy, or icy) road conditions and/or at higher speed (e.g., 60 m.p.h.) compare to breaking distance and vehicle stopping distance under optimal (e.g., dry) road conditions at low speed (e.g., 30 m.p.h.).

3 Second Rule 803 comprises an audiovisual presentation illustrating how a driver can maintain a 3 second space cushion between his vehicle and vehicles in front of him which can serve as a safety net into which a driver can steer around a hazard if stopping distance is too great to allow a driver to stop his vehicle to avoid a hazard. In preferred embodiments, the audiovisual presentation comprises a simulated driving scenario in which a narrator designates a landmark and counts out 3 seconds to illustrate that the simulator driver is maintaining a 3-second space cushion.

Space Management 804 comprises an audiovisual presentation illustrating how to maintain a space cushion in front of, beside, and behind a driver's vehicle; how to manage space around a vehicle to maintain potential escape routes; and how to drive with the flow of traffic. In a preferred embodiment, Space Management 804 further comprises animations illustrating these points.

In some embodiments, Space Management 804 can be supplemented with a speed and space exercise during additional driving practice with a mentor in an actual motor vehicle. This supplemental activity is designed to allow a trainee to practice critical speed and space management skills, to wit: adjusting his speed to respond to driving conditions, maintaining an adequate space cushion, identifying possible escape route, and staying out of the blind spots of other vehicles. In this exercise, the trainee is tasked with driving while the mentor observes and logs observations and suggestions for improvement. The trainee is further tasked with commenting on what is being done to: adjust his speed to match road conditions; adjust his speed to match visibility and sight distance; adjust his speed to match the flow of traffic; maintain an adequate space cushion around your car (3 seconds as a rule, 4 seconds if possible, and never less than 2 seconds); maintain a safe distance in front and rear when changing lanes or merging; identify possible escape routes; and avoid driving in the blind spots of other vehicles. The mentor is also tasked with asking the trainee (once or twice when it is safe to do so) to estimate how many seconds he is behind the car in front of him. After the drive, the trainee and the mentor refer to the logged observations and suggestions to identify strategies for managing speed and space for safer driving.

Module Review 805 comprises a written review of critical information presented within Speed and Space Module 800, including, in one embodiment: that road conditions, visibility, and traffic determine how fast one should drive; that sight distance is defined by how fast a vehicle is going and how far a driver can see; that speed affects how much distance is necessary to stop a vehicle; that vehicles operate under the laws of physics such that braking distance is dependent on road conditions and speed (e.g., doubling speed doubles a driver's reaction distance and quadruples braking distance); that creating a space cushion around one's vehicle protects a driver from the speed of other vehicles; that a driver's following distance should leave enough space to stop without colliding with a vehicle in front the driver's vehicle; that a minimum two-second, but preferably four-second following distance gives a driver a sufficient space cushion to allow the driver to react safely to what is happening in front of the driver's vehicle; that a driver should manage space around his vehicle to see possible escape routes; that a driver should position his vehicle while driving so as not to drive in blind spots of other vehicles; that a driver should maintain a generous space cushion around his vehicle and drive with the flow of traffic without changing lanes often or unnecessarily; and that more space around one's vehicle reduces risks associated with speed.

Quiz 806 comprises a multiple choice quiz to assess comprehension of crucial information presented during Speed and Space Module 800. In one embodiment, multiple choice questions are drawn (with or without replacement) from a database of relevant multiple choice questions. In one embodiment, a trainee must pass 75% of the questions in order to proceed to another module.

Review Certification Questions 807 comprises possible key points presented during Speed and Space Module 800 that may be encountered on a multiple choice certification exam and/or psychometric assessment using driving simulations, both designed to assess understanding and acquisition of critical crash-avoidance skills at the conclusion of the training program.

Figure 9:
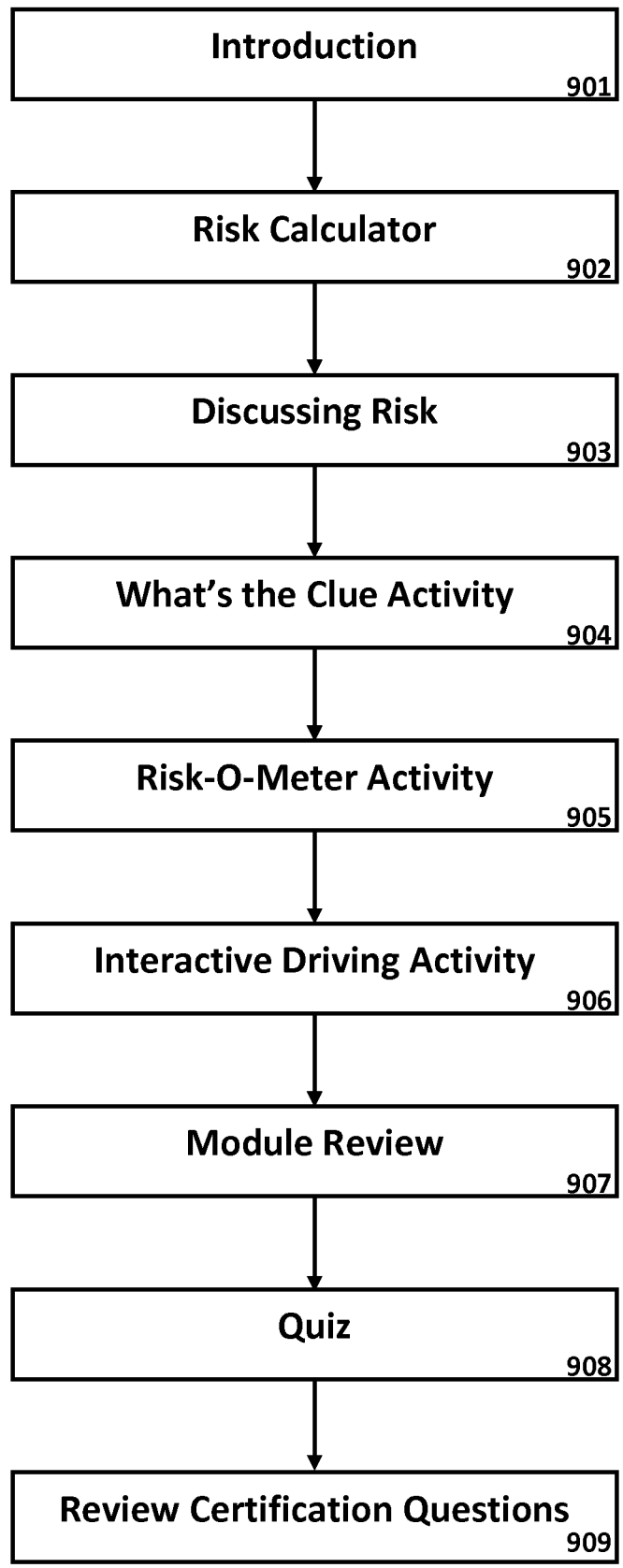
FIG. 9 is a flow diagram depicting a module for training risk perception according to one embodiment.

Referring now to FIGS. 2 and 9, typical activities during a Risk Perception Module 900 according to one embodiment are shown. In Risk Perception Module 900, a trainee is instructed about risk and how to manage risk while driving. Introduction 901 comprises an audiovisual presentation used to inform and instruct a trainee on important information about risk, including: that less experienced motor vehicle operators tend not to see risks that more experienced drivers see; that less experienced motor vehicle operators feel invulnerable and find taking risks to be more appealing; and that motor vehicle operators with better safety records recognize, assess, and respond to risk on the road; that risk is inherent in driving; that risk is based on exposure and is cumulative; that cumulative risk adds up over time and can increase the probability that a driver will be involved in an accident; and that risk can be managed.

Risk Calculator 902 comprises an interactive virtual calculator designed to graphically demonstrate to a trainee how taking multiple risks at the same time can significantly increase a driver's chance of being involved in a collision. By decreasing or avoiding these risks, a driver decreases his chances of a collision. In a preferred embodiment, Risk Calculator 902 comprises a virtual calculator which has, instead of numbers, 4 categories for which risk can be manipulated: time of day (night or day), number of occupants in a vehicle (no passengers, 1, 2, or 3), distracted driving factors (no distractions, operating stereo, reaching for an object, grooming, eating, talking on phone, or texting), and risky driving behaviors (no risky driving, speeding by 10 m.p.h., speeding by 20 m.p.h., or tailgating). A trainee can manipulate risk in each of these categories and be presented with a display indicating how much the driver's crash risk would increase. The estimates of increased crash risk are based on many different research findings. Research risk estimates often vary. In some embodiments, research findings are averaged to obtain a risk estimate (e.g., research finds texting while driving to be anywhere from 8× to 23× more risky than not texting, so an average can be used), while in other embodiments, the more conservative lower risk estimate is used (i.e., texting brings an 8× increase in risk).

In some embodiments, when calculating a total risk, risk associated with time of day and number of passengers is assumed to be additive. Distracted driving factors and risky driving behaviors are assumed to increase crash risk more than just adding the increased risk for each option. Thus, while texting along might increase risk 8×, and tailgating may increase risk 3×, texting while tailgating is assumed to be more risky than just the sum of the two options, so the factors are multiplied to arrive at an estimated increased risk of 24×. As one example of concurrent and cumulative risk, driving at night, with 3 passengers, while tailgating and reaching for an objective increases a driver's risk of a crash 3142%, compared to driving during the day with no passengers, no distraction, and no distracted driving.

Discussing Risk 903 comprises an audiovisual presentation designed to present truths and misconceptions about risk as well as safe driving tips to control risk. In one embodiment, information is presented that shows risky is fluid and risky driving does not save a driver time in arriving at a destination. In one embodiment, tips to minimize driving risks are presented, including tips to avoid risky behaviors, adjust speed and manage space, use visual search techniques to identify risks, and keep driving habits consistent.

What's the Clue Activity 904 comprises one or more interactive simulation activities designed to heighten a trainee's perception of risks and provide the trainee practice in identifying risks in a variety of driving scenarios. In one embodiment, What's the Clue Activity 904 comprises one or more levels, each with two or more simulated driving scenarios. In some embodiments, a trainee must successfully complete a pre-established number of these simulated driving scenarios to progress to a new module.

The simulated driving scenarios are similar to those discussed elsewhere herein (e.g., as discussed with reference to Visual Awareness Activity 602), except that the trainee is tasked with clicking on the section of the display containing a clue that the situation is changing or about to change. As with other simulated driving scenarios, a trainee is asked to "drive" in the simulation while attending to everything going on around him such as where other vehicles and/or pedestrians are. Some examples of such clues, without limitation, include a car double-parked, pedestrians entering a crosswalk, a pedestrian jaywalking across street, pedestrians exiting a parked car, a traffic light changing colors, a car being driven aggressively, or a car switching lanes.

In one embodiment, after each simulated driving scenario has concluded, computing device 1501 displays the number of clues missed. If clues were missed, the trainee is provided an opportunity to try the same simulated driving scenario again or see a tutorial before trying the same simulated driving scenario again. If no clues were missed, the trainee can proceed to the next simulated driving scenario. Once a predetermined sufficient number of simulated driving scenarios have been successfully completed, the trainee can proceed to the next activity.

Risk-O-Meter Activity 905 comprises one or more interactive simulation activities designed to heighten a trainee's ability to recognize and respond to risks and provide the trainee practice in identifying risks in a variety of driving scenarios. In one embodiment, Risk-O-Meter Activity 905 comprises one or more levels, each with two or more simulated driving scenarios. In some embodiments, a trainee must successfully complete a pre-established number of these simulated driving scenarios to progress to a new module.

The simulated driving scenarios are similar to those discussed elsewhere herein (e.g., as discussed with reference to What's the Clue Activity 904), and as with other simulated driving scenarios, a trainee is asked to "drive" in the simulation while attending to everything going on around him such as where other vehicles and/or pedestrians are. For Risk-O-Meter 905, however, the trainee is tasked with evaluating whether the degree of risk in the driving scenario (compared to an earlier point in time in the same simulated driving scenario) has increased, decreased, or stayed the same.

In one embodiment, after each simulated driving scenario has concluded, feedback is provided. If risk was incorrectly assessed, the trainee is provided with an explanation of what was missed. A trainee is provided with an opportunity to try the same simulated driving scenario again or see a tutorial before trying the same simulated driving scenario again. If risk was correctly judged throughout a driving scenario, the trainee can proceed to the next simulated driving scenario. Once a predetermined sufficient number of simulated driving scenarios have been successfully completed, the trainee can proceed to the next activity.

Interactive Driving Activity 906 comprises a narrated explanation of a mentor/trainee exercise during additional driving practice with a mentor in an actual motor vehicle. This activity is designed to allow a trainee to combine visual awareness, hazard recognition, and speed and space management skills to recognize, point out, and respond to risk. In this activity, as a trainee drives, the mentor is tasked with logging risks encountered on the trip and how the driving trainee deals with the risks. The mentor can also log the trainee's comments about encountered hazards. After the drive, the trainee and the mentor switch roles and the trainee logs risks identified by the mentor as he drives. The logged notes are used after the driving activity to provide feedback and identify strategies for dealing with each risky situation in a better and safer way to minimize danger. Some examples of risks include freeway on-ramps and off-ramps, traffic with lots of lane changing, tailgaters, speeders weaving through traffic, drivers texting or talking on the phone, poor road conditions, and bad weather.

Module Review 907 comprises a written review of critical information presented within Risk Perception Module 900, including, in one embodiment: that experienced drivers recognize, assess, and respond to risk on the road; that less experienced drivers tend not to see risks that drivers with years of experience see; that young drivers feel invulnerable in part because brain chemistry is not fully developed until around age 25; that risk is based on exposure, so the more one drives, the more likely one is to be in a crash; that risk is inherent to driving, but can be minimized by behavioral and lifestyle choices; that risk is cumulative over time as risky behaviors are repeated; that risk is fluid in that it continually changes as one drives based on factors and situations around the driver; that taking risks doesn't get a driver where he is going any faster; and that risk can be minimized by keeping driving habits consistent, avoiding risky behaviors (e.g., tailgating, speeding, showing off), and using critical driving skills such as active visual search techniques to identify potential hazards, adjusting speed to the speed of surrounding traffic, and leaving a good space cushion from other vehicles.

Quiz 908 comprises a multiple choice quiz to assess comprehension of crucial information presented during Risk Perception Module 900. In one embodiment, multiple choice questions are drawn (with or without replacement) from a database of relevant multiple choice questions. In one embodiment, a trainee must pass 75% of the questions in order to proceed to another module.

Review Certification Questions 909 comprises possible key points presented during Risk Perception Module 900 that may be encountered on a multiple choice certification exam and/or psychometric assessment using driving simulations, both designed to assess understanding and acquisition of critical crash-avoidance skills at the conclusion of the training program.

Figure 10:
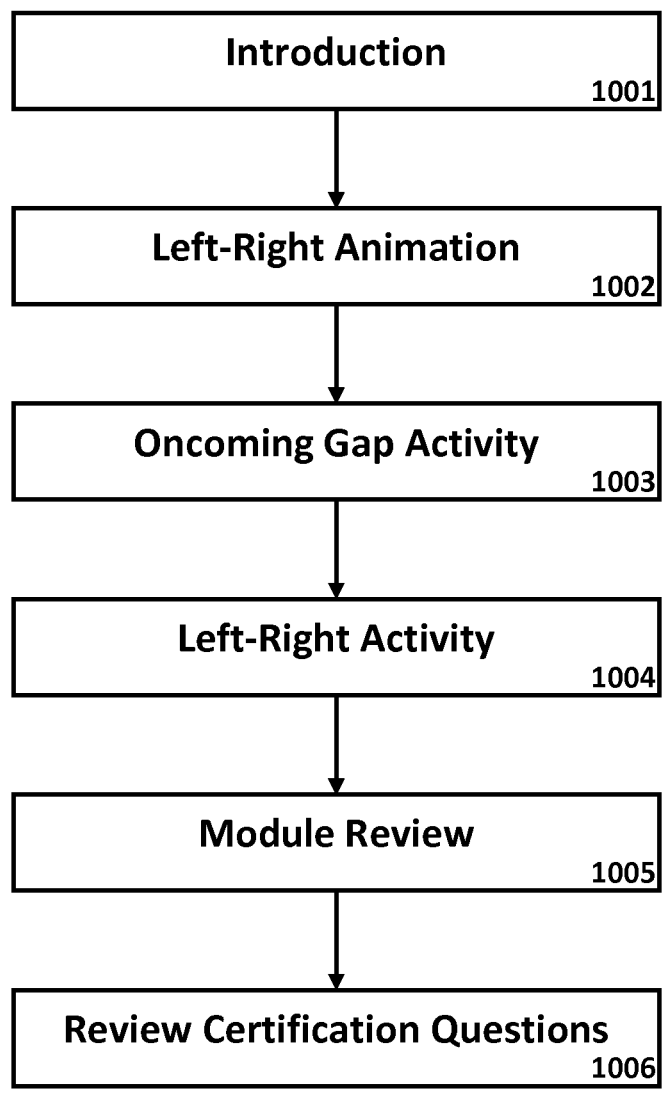
FIG. 10 is a flow diagram depicting a module for training gap analysis according to one embodiment.

Referring now to FIGS. 2 and 10, typical activities during a Gap Analysis Module 1000 according to one embodiment are shown. Misjudging gaps at intersections is a leading cause of vehicle crashes for all age groups and types of drivers. Thus, in some embodiments, gap analysis is a key psychometric of crash-avoidance training described herein. In Gap Analysis Module 1000, a trainee is instructed about how to judge gaps in oncoming traffic to complete left and right turns. Introduction 1001 comprises an audiovisual presentation used to inform and instruct a trainee on: how to judge safe gaps in traffic at intersections and other situations (e.g., when exiting a parking lot) by using active visual search, hazard detection, and space management skills to judge a safe gap in traffic; how to estimate distance and speed of approaching vehicles; and how to judge a safe oncoming gap; how to judge safe left-right gaps.

Left-Right Animation 1002 comprises an animated audiovisual presentation visually illustrating left gap and right gap analysis for a vehicle stopped at an intersection, preferably as a narrator describes and explains the animation. The purpose of the animated presentation is to illustrate how a driver can judge speed and distance of vehicles approaching from the left or from the right of the driver's car in order to be able to safely move through an intersection. A critical driving skill taught through Left-Right Animation 1002 is a general rule that a driver attempting a left turn should have an oncoming gap ("left gap") of 6-seconds between his vehicle and a vehicle approaching from the right and an oncoming gap (right gap) of 4-seconds between his vehicle and a vehicle approaching from the left.

Oncoming Gap Activity 1003 comprises one or more interactive simulation activities designed to heighten a trainee's ability to recognize safe oncoming gaps and provide the trainee practice in identifying safe oncoming gaps in a variety of driving scenarios. In one embodiment, safe gap analysis is assessed under different levels of cognitive load associated with the driving scenario and/or different levels of complexity of the requisite task. Cognitive load can be classified into levels ranging from low to high cognitive load. For example, the cognitive load on a driver in a residential area with little activity and with little slow-moving traffic is low, whereas the cognitive load on the driver in a high activity urban area on a multilane road with heavy, faster moving traffic, tailgaters, and pedestrians at congested intersections is higher. In one embodiment, the interactive simulation comprises one or more cognitive load levels, each with two or more simulated driving scenarios. In another embodiment, the complexity of the task is varied by changing the traffic flow within a driving scenario. Thus, an interactive scenario with traffic flow with large gaps (e.g., over 8 second gaps between cars) would be a low complexity level. Traffic flow with gaps approaching the target gap of 4 seconds (e.g., 3 to 5 second gaps in traffic) would be a more difficult complexity. In one embodiment, Oncoming Gap Activity 1003 comprises one or more levels of increasing complexity, each with two or more simulated driving scenarios. In some embodiments, a trainee must successfully complete a pre-established number of these simulated driving scenarios to progress to a new module.

The simulated driving scenarios are similar to those discussed elsewhere herein (e.g., as discussed with reference to What's the Clue Activity 904), and as with other simulated driving scenarios, a trainee is asked to "drive" in the simulation while attending to everything going on around him such as where other vehicles and/or pedestrians are. For Oncoming Gap Activity 1003, however, the trainee is tasked with judging speed and distance of oncoming cars in order to determine when a safe oncoming gap exists for a left turn (i.e., a safe left gap) under varying levels of complexity and cognitive load within driving scenarios.

In one embodiment, after each simulated driving scenario has concluded, feedback is provided. If one or more oncoming gaps was misjudged (i.e., a trainee indicated that a safe oncoming gap existed when such a gap did not exist or when a trainee did not indicate a safe oncoming gap that did exist), the trainee is provided a summary of how many identified oncoming gaps were safe, risky, unsafe, or missed. A trainee is provided with an opportunity to try the same simulated driving scenario again, try the same simulated driving scenario again with help (e.g., indications of when a turn would be safe, risky, or unsafe), view a tutorial before trying the same simulated driving scenario again, or receiving an explanation of what was missed, which identified oncoming gaps would be risky, which identified oncoming gaps would be unsafe, and which oncoming gaps were correctly identified. If risk was correctly judged throughout a driving scenario, the trainee can proceed to the next simulated driving scenario. In a preferred embodiment, complexity of the task increases as a trainee moves from one simulated driving scenario to the next (e.g., an initial simulated driving scenario may task the trainee with identifying safe oncoming gaps in an open intersection with oncoming cars only, while a next scenario may task the trainee with identifying safe oncoming gaps in a traffic light-regulated intersection with cars and pedestrians at the intersection. Once a predetermined sufficient number of simulated driving scenarios have been successfully completed, the trainee can proceed to the next activity.

Left-Right Activity 1004 comprises one or more interactive simulation activities designed to heighten a trainee's ability to recognize safe left/right gaps and provide the trainee practice in identifying safe left/right gaps in a variety of driving scenarios. In one embodiment, safe oncoming gaps determinations are assessed under different levels of cognitive load associated with the driving scenario and/or different levels of complexity of the requisite task. Cognitive load can be classified into levels ranging from low to high cognitive load. For example, the cognitive load on a driver in a residential area with little activity and with little slow-moving traffic is low, whereas the cognitive load on the driver in a high activity urban area on a multilane road with heavy, faster moving traffic, tailgaters, and pedestrians at congested intersections is higher. In one embodiment, the interactive simulation comprises one or more cognitive load levels, each with two or more simulated driving scenarios. In one embodiment, Left-Right Activity 1004 comprises one or more levels of increasing complexity and/or one or more levels of increasing cognitive load, each with two or more simulated driving scenarios. In some embodiments, a trainee must successfully complete a pre-established number of these simulated driving scenarios to progress to a new module.

The simulated driving scenarios are similar to those discussed elsewhere herein (e.g., as discussed with reference to Oncoming Gap Activity 1003), and as with other simulated driving scenarios, a trainee is asked to "drive" in the simulation while attending to everything going on around him such as where other vehicles and/or pedestrians are. For Left-Right Activity 1004, however, the trainee is tasked with judging speed and distance of oncoming cross-traffic from both the left and right in order to determine when a safe left/right gap exists for a left turn. The panable display of the simulated driving scenario enables a trainee, as taught, to look in both directions (left and right) before indicating that safe oncoming gap exists. In various embodiments, performance of the trainee is assessed with interactive scenarios of increasing levels of cognitive load and/or increasing levels of complexity.

In one embodiment, after each simulated driving scenario has concluded, feedback is provided. If one or more left/right gaps was misjudged (i.e., a trainee indicated that a safe left/right gap existed when such a gap did not exist or when a trainee did not indicate a safe left/right gap that did exist), the trainee is provided a summary of how many identified gaps were safe, risky, unsafe, or missed. A trainee is provided with an opportunity to try the same simulated driving scenario again, try the same simulated driving scenario again with help (e.g., indications of when a turn would be safe, risky, or unsafe), view a tutorial before trying the same simulated driving scenario again, or receiving an explanation of what was missed, which identified left/right gaps would be risky, which identified left/right gaps would be unsafe, and which left/right gaps were correctly identified. If risk was correctly judged throughout a driving scenario, the trainee can proceed to the next simulated driving scenario. In a preferred embodiment, complexity of the task increases as a trainee moves from one simulated driving scenario to the next (e.g., an initial simulated driving scenario may task the trainee with identifying safe oncoming gaps in an open intersection with oncoming cars only, while a next scenario may task the trainee with identifying safe oncoming gaps in a traffic light-regulated intersection with cars and pedestrians at the intersection. In another embodiment, complexity of the task can be varied by varying the time between approaching vehicles (e.g., a low complexity task might have a 9 second gap between oncoming vehicles and the trainee's vehicle, whereas a higher complexity task might have a 4 second gap from the vehicle approaching on the trainee's left and a 6 second gap from the vehicle approaching on the trainee's right). Once a predetermined sufficient number of simulated driving scenarios have been successfully completed, the trainee can proceed to the next activity.

Module Review 1005 comprises a written review of critical information presented within Gap Analysis Module 1000, including, in one embodiment: judging a safe oncoming gap involves an estimation of both distance and speed of oncoming traffic; safe oncoming gaps (needed to make a left-turn across lanes of oncoming traffic) and safe left-right gaps (needed to make a left turn across multiple lanes of traffic when traffic is coming from both left and right directions) are determined by using active visual search, hazard detection, and space management skills; a minimum of a 4-second oncoming gap is recommended before starting to make a left turn across oncoming traffic; and a minimum 6-second oncoming gap in traffic from the right in addition to a minimum of a 4-second oncoming gap in traffic from the left is recommended for a safe left-right gap.

Review Certification Questions 1006 comprises possible key points presented during Gap Analysis Module 1000 that may be encountered on a multiple choice certification exam and/or psychometric assessment using driving simulations, both designed to assess understanding and acquisition of critical crash-avoidance skills at the conclusion of the training program.

Figure 11:
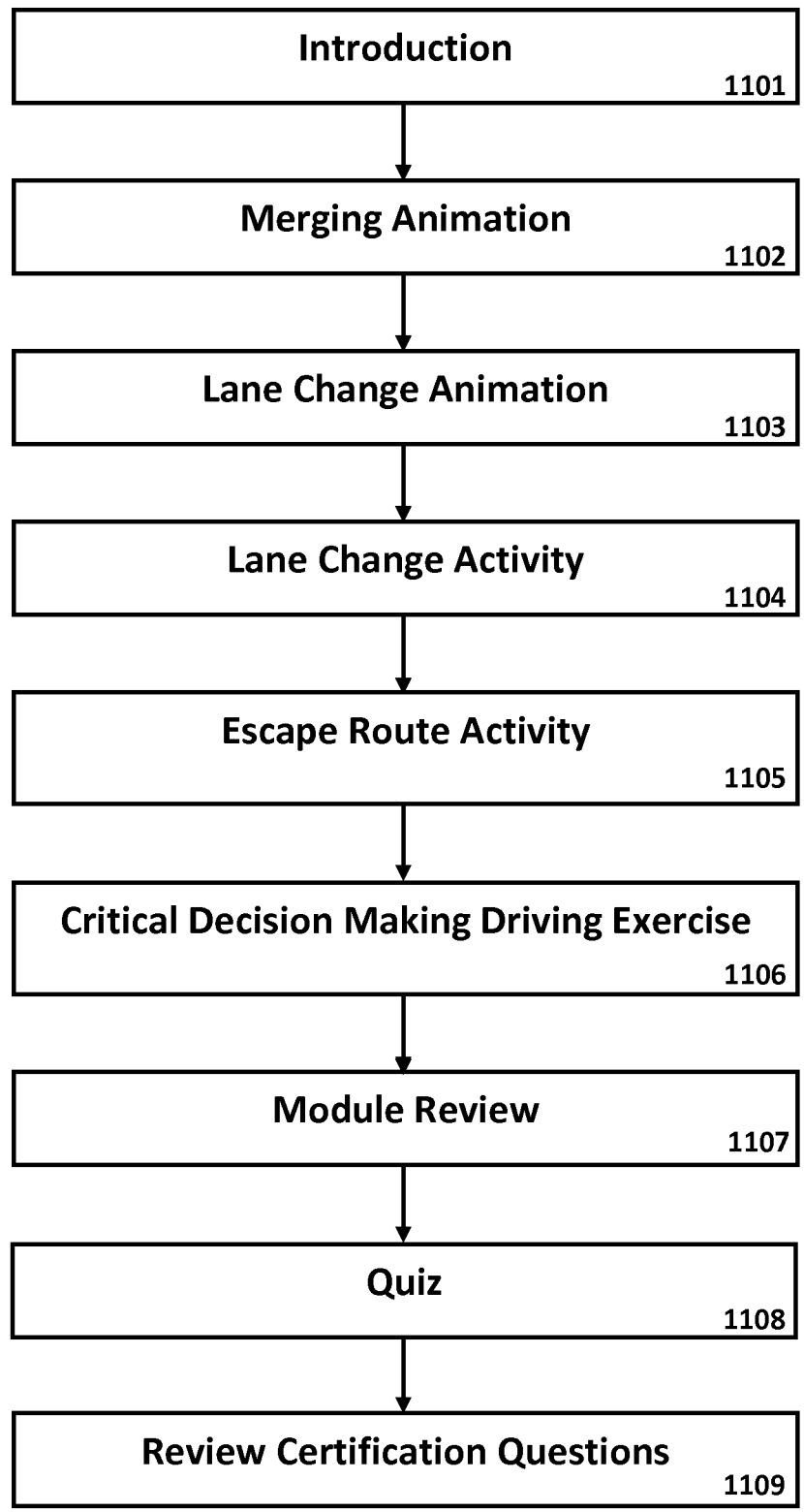
FIG. 11 is a flow diagram depicting a module for training critical decision making according to one embodiment.

Referring now to FIGS. 2 and 11, typical activities during a Critical Decision Making Module 1100 according to one embodiment are shown. In Critical Decision Making Module 1100, a trainee is instructed about how to make critical decisions such as merging onto highways, changing lanes, and maintaining an escape route. Introduction 1001 comprises an audiovisual presentation used to inform and instruct a trainee about how to make critical decisions (such as merging into traffic and changing lanes) using crash-avoidance skills such as visual search, hazard detection, speed adjustment, space management, and gap analysis.

Merging Animation 1102 comprises an animated audiovisual presentation visually illustrating (preferably as a narrator describes and explains the animation) how to judge traffic flow to identify safe merge opportunities and how to correctly merge into traffic on a highway by accelerating vehicle speed to match the flow of traffic, leaving plenty of space by looking for a safe gap in traffic, and signaling to help other drivers see one's vehicle and understand one's intentions.

Lane Change Animation 1103 comprises an animated audiovisual presentation visually illustrating (preferably as a narrator describes and explains the animation) how to how to safely change lanes, to wit: having enough space in front of and behind one's vehicle in the lane into which one intends to move, glancing over one's shoulder to confirm that no vehicle blocks one's intended route into the new lane, and using one's properly adjusted mirrors to judge safe lane changes.

Lane Change Activity 1104 comprises one or more interactive simulation activities designed to heighten a trainee's ability to recognize safe lane chance opportunities and provide the trainee practice in changing lanes safely in a variety of driving scenarios. In one embodiment, Lane Change Activity 1104 comprises one or more levels of increasing complexity each with two or more simulated driving scenarios. For example, a driving scenario with slower moving light traffic and large gaps between cars is of lower complexity than a driving scenario with moderate or heavy traffic with multiple risky lane change opportunities. In some embodiments, a trainee must successfully complete a pre-established number of these simulated driving scenarios to progress to a new module.

The simulated driving scenarios are similar to those discussed elsewhere herein (e.g., as discussed with reference to Oncoming Gap Activity 1003), and as with other simulated driving scenarios, a trainee is asked to "drive" in the simulation while attending to everything going on around him such as where other vehicles and/or pedestrians are. For Lane Change Activity 1104, however, the trainee is tasked with judging speed and distances of traffic in one's lane and neighboring lanes in order to determine when a safe opportunity exists for a lane change. In one embodiment, lane change opportunities are assessed under different levels of cognitive load associated with the driving scenario and/or different levels of complexity of the requisite task. Cognitive load can be classified into levels ranging from low to high cognitive load. For example, the cognitive load on a driver in a residential area with little activity and with little slow-moving traffic is low, whereas the cognitive load on the driver in a high activity urban area on a multilane road with heavy, faster moving traffic, tailgaters, and pedestrians at congested intersections is higher. In one embodiment, the interactive simulation comprises one or more cognitive load levels, each with two or more simulated driving scenarios. In another embodiment, the complexity of the task is varied by changing the traffic flow within a driving scenario.

In one embodiment, after each simulated driving scenario has concluded, feedback is provided. If one or more oncoming gaps was misjudged (i.e., a trainee indicated that a safe lane change was possible when a lane change was risky or unsafe, or a trainee missed an opportunity for a safe lane change), the trainee is provided a summary of how many identified lane change opportunities were safe, risky, unsafe, or missed. A trainee is provided with an opportunity to try the same simulated driving scenario again, try the same simulated driving scenario again with help (e.g., indications of when a turn would be safe, risky, or unsafe), view a tutorial before trying the same simulated driving scenario again, or receiving an explanation of what was missed, which identified lane change opportunities would be risky, which identified lane change opportunities would be unsafe, and which lane change opportunities were correctly identified. If lane change opportunities are correctly judged throughout a driving scenario, the trainee can proceed to the next simulated driving scenario. In a preferred embodiment, complexity of the task increases as a trainee moves from one simulated driving scenario to the next (e.g., an initial simulated driving scenario may task the trainee with identifying safe opportunities to change into a neighboring right lane on a city street, while a next scenario may task the trainee with identifying safe opportunities to change into a neighboring right or left lane on a freeway). Once a predetermined sufficient number of simulated driving scenarios have been successfully completed, the trainee can proceed to the next activity.

Escape Route Activity 1105 comprises one or more interactive simulation activities designed to heighten a trainee's ability to recognize safe escape routes and provide the trainee practice in reacting safely to sudden changes in traffic flow within various driving scenarios. In one embodiment, Escape Route Activity 1105 comprises one or more levels, each with two or more simulated driving scenarios. In some embodiments, a trainee must successfully complete a pre-established number of these simulated driving scenarios to progress to a new module.

The simulated driving scenarios are similar to those discussed elsewhere herein (e.g., as discussed with reference to Oncoming Gap Activity 1003), and as with other simulated driving scenarios, a trainee is asked to "drive" in the simulation while attending to everything going on around him such as where other vehicles and/or pedestrians are. For Escape Route Activity 1105, however, the trainee is tasked with being visually aware of where traffic is in all views in order to determine how to recognize and take advantage of a safe escape route should normal traffic flow is interrupted. Possible escape routes involve moving speeding up, slowing down, moving right, moving left, moving right or left while slowing down, or moving right or left when speeding up.

In one embodiment, after each simulated driving scenario has concluded, feedback is provided. If an escape route was misjudged (i.e., a trainee indicated that his vehicle should speed up when the correct escape route is to slow down and move the vehicle to the right), the correct escape route is identified for the trainee along with an explanation of why that escape route is preferable over or more other options. A trainee is provided with an opportunity to try the same simulated driving scenario again, view a tutorial before trying the same simulated driving scenario again, or receiving an explanation of what was missed. If escape routes are correctly judged throughout a driving scenario, the trainee can proceed to the next simulated driving scenario. In a preferred embodiment, complexity of the task increases as a trainee moves from one simulated driving scenario to the next (e.g., an initial simulated driving scenario may task the trainee with identifying an escape route on a residential street with little traffic, while a next scenario may task the trainee with identifying an escape route when traveling a high speeds on a crowded freeway). Once a predetermined sufficient number of simulated driving scenarios have been successfully completed, the trainee can proceed to the next activity.

In some embodiments, Critical Decision Making 1100 can be supplemented with Critical Decision Making Driving Exercise 1106. Critical Decision Making Driving Exercise 1106 comprises additional driving practice with a mentor in an actual motor vehicle.

This supplemental activity is designed to allow a trainee to practice critical visual awareness, hazard recognition, and speed and space management skills while concentrating on highway merges, lane changes, and determining escape routes. In this exercise, the trainee is tasked with driving while the mentor observes and logs observations and suggestions for improvement. The trainee is further tasked with commenting on what he is seeing, feeling, and doing to help him recognize and respond to various driving situations (including merging on and off the freeway and changing lanes) and identifying potential escape routes, and specifically oh how he is using visual search techniques (forward, to the sides, behind) to identify hazards, how he is adjusting his speed to match the flow of traffic, road conditions, and visibility, and the kind of space cushion he is keeping in relation to vehicles around him. The mentor is also tasked with asking the trainee (once or twice when it is safe to do so) to estimate how many seconds he is behind the car in front of him. After the drive, the trainee and the mentor refer to the logged observations and suggestions to identify strategies for managing lane changes and safe merges. In one embodiment, the trainee and the mentor switch roles so that the mentor drives while the trainee acts as an observer tasked with providing feedback.

Module Review 1107 comprises a written review of critical information presented within Critical Decision Making Module 1100, including, in one embodiment: how to correctly merge into traffic on a highway by accelerating vehicle speed to match the flow of traffic, leaving plenty of space by looking for a safe gap in traffic, and signaling to help other drivers see one's vehicle and understand one's intentions; how to avoid merging mistakes (e.g., coming to stop on an on-ramp, being too aggressive while trying to merge onto a busy highway); how to safely change lanes (e.g., having enough space in front of one's vehicle in the lane into which one wants to move, checking that no vehicle is in one's side mirror, glancing over one's shoulder to confirm that no vehicle blocks one's intended route into the new lane, and checking one's rearview mirror to confirm no vehicle one's intended route into the new lane); and how to maintain an escape route and know when to use the escape lane.

Quiz 1108 comprises a multiple choice quiz to assess comprehension of crucial information presented during Critical Decision Making Module 1100. In one embodiment, multiple choice questions are drawn (with or without replacement) from a database of relevant multiple choice questions. In one embodiment, a trainee must pass 75% of the questions in order to proceed to another module.

Review Certification Questions 1109 comprises possible key points presented during Critical Decision Making Module 1100 that may be encountered on a multiple choice certification exam and/or psychometric assessment using driving simulations, both designed to assess understanding and acquisition of critical crash-avoidance skills at the conclusion of the training program.

Figure 12:
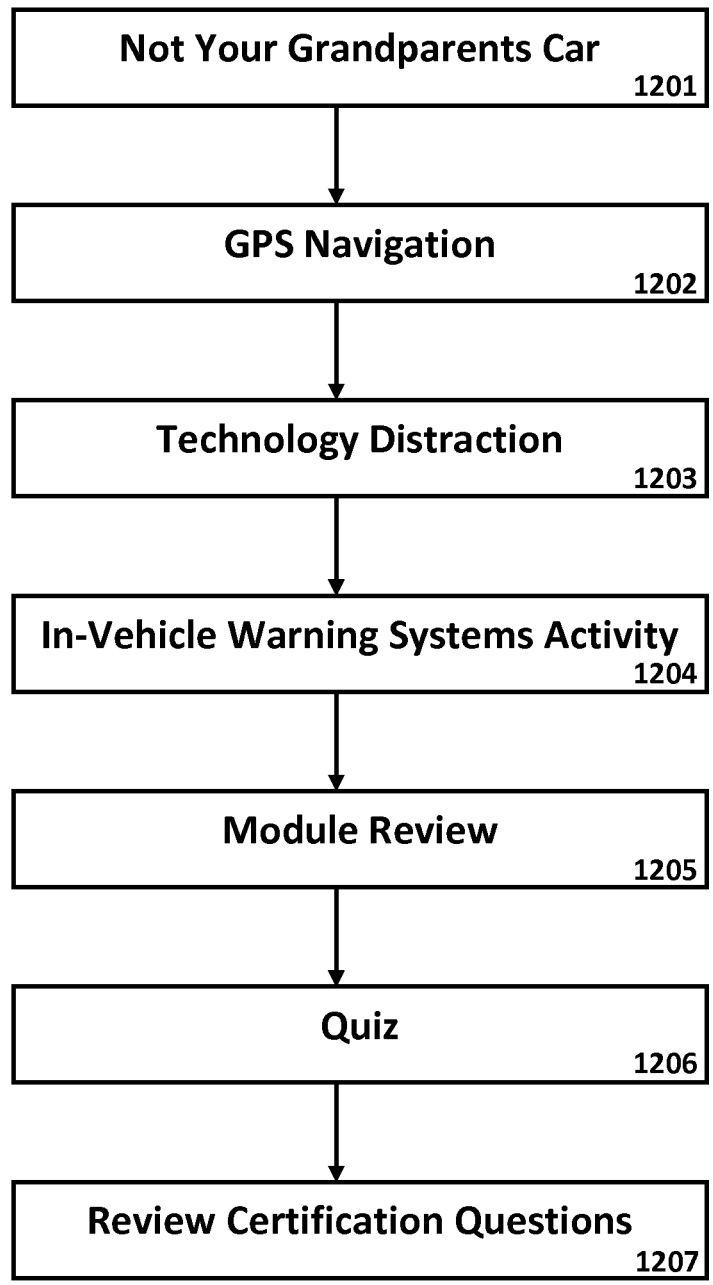
FIG. 12 is a flow diagram depicting a module for training technology enriched driving according to one embodiment.

Referring now to FIGS. 2 and 12, typical activities during a Technology Enriched Driving Module 1200 according to one embodiment are shown. In Technology Enriched Driving Module 1200, a trainee is provided information about how technology-assisted driving (e.g., use of navigation systems (e.g., Global Positioning Satellite (GPS)), back-up cameras, blind spot indicators, lane-departure warnings, electronic stability control mechanisms, safety belt load limits and pretension, advanced frontal airbags, advanced side airbags and curtains, steering controls, etc.) can be used safely as crash avoidance tools to decrease the probability of being involved in an accident. The goal of Technology Enriched Driving Module 1200 is to provide data and guidance about how to use motor vehicle-related technology to drive more safely and thereby decrease the probability of being involved in a motor vehicle accident.

Not Your Grandparents Car 1201 comprises an audiovisual presentation designed to educate trainees about how safety features of motor vehicles have changed in recent years; explain to trainees technological advances provide safety protections within a vehicle (e.g., seat belts, advanced frontal airbags, advanced side airbags and curtains, steering controls, etc.), as well as limitations of those technological advances (e.g., seat belts and air bags save lives, but can cause serious injuries (e.g., if safety belt load limits are exceeded or passenger seat load requirements are not met for deployment of passenger airbags); introduce trainees to different technologies available on modern motor vehicles (e.g., GPS navigation, voice commands, hands-free operations, cameras, impending collision warnings, blind spot indicators, lane departure warnings, electronic stability control mechanisms, advanced frontal and side airbags, steering controls, etc.); educate trainees on the potential advantages, as well as potentials dangers of using these new technologies; inform trainees about the impact of these new technologies on crash avoidance rates; teach trainees how increased automation of driving functions can increase distraction and decrease attention due to underlying neurocognitive changes; and introduce trainees on techniques to remain focused and non-distracted while using the improved technologies now offered as standard on modern motor vehicles.

GPS Navigation 1202 comprises an audiovisual presentation used to inform and instruct a trainee about how to correctly program GPS navigation technology (e.g., embedded in vehicle software and/or freestanding GPS units). The goal of GPS Navigation 1201 is to inform trainees to think about programming GPS technology assistance before operating a motor vehicle, stopping a vehicle risks so they can make better, safer decisions about potentially risky behavior.

Technology Distraction 1203 comprises an audiovisual presentation illustrating how using technological advances (e.g., GPS, cruise-control, back-up cameras, blind spot indicators, lane-departure warnings, etc.) can negatively impact a driver's abilities to drive safely. Technology Distraction 1203 is designed to illustrate how cognitive distractions caused by technology (e.g., focusing on navigation system by glancing at a display or listening to narrated directions, frustration by imperfect voice to text technologies, focusing on a rear backup camera display, experiencing a visual or auditory collision-avoidance warning, etc.) can affect a driver's abilities to see and react to changes in a driving environment. In one embodiment, Technology Distraction 1203 comprises statistics demonstrating the dangers of using technology while driving (e.g., National Safety Council 2012 estimates 24% of all accidents are caused by drivers using cell phones and/or texting; texting is associated with 60% of all rear end collisions; cognitive load and glance down times are additive and increase the likelihood of missing safety critical events; driver distractions (e.g., texting) and risky driving behaviors (e.g., tailgating) are multiplied). In a preferred embodiment, Technology Distraction 1203 additionally comprises actual video footage, animated illustration, and/or other graphic illustration showing how technology-introduced distractions (e.g., focusing on navigation system by glancing at a display or listening to narrated directions) of approximately 3 seconds in duration increase reaction time by one second and increase reaction distance because the brain needs time to process changes in the visual environment that occur during the glance down. Reaction distance is increased as a function of the distance traveled during actual glance down time. For example, in a vehicle traveling 60 m.p.h, a driver requiring a 1-second brain recalibration to a new visual array would need an additional reaction distance of 88 feet. In various embodiments, Technology Distraction 1203 comprises graphic illustration that a vehicle traveling at a high rate of speed (e.g., 60 m.ph.) can travel a great distance (e.g., 264 feet) during a 3-second lapse due to technology-induced visual or auditory distraction, which increases total reaction time distance to 353 feet for the 3-second glance down. In some embodiments, Technology Distraction 1203 comprises research methods, data, results, and conclusions indicating that a taxonomy of cognitive load can be used to estimate increased crash risk associated with specific types of distractions (see, e.g., D. Strayer et al. (October 2014), "Measuring Cognitive Distraction in the Automobile II: Assessing In-Vehicle Voice-Based Interactive Technologies, AAA Foundation for Traffic Safety"; Strayer et al. (June 2013), "Measuring Cognitive Distraction in the Automobile"). As described elsewhere herein, cognitive load assessments can be used in POV simulations that address technology distractions.

In-Vehicle Warning Systems Activity 1204 comprises one or more interactive simulation activities designed to heighten a trainee's ability to drive safely using advantages provided by technology embedded within a motor vehicle (e.g., back-up cameras, blind spot indicators, collision-avoidance warnings, collision-avoidance auto-correct features, lane-departure warnings, lane-departure auto-correct features, electronic stability control mechanisms) and provide the trainee practice in reacting safely to warnings or auto-corrections within various driving scenarios. In one embodiment, In-Vehicle Warning Systems Activity 1204 comprises one or more levels, each with two or more simulated driving scenarios. In some embodiments, a trainee must successfully complete a pre-established number of these simulated driving scenarios to progress to a new module. In various embodiments, In-Vehicle Warning Systems Activity 1204 comprises interactive simulation activities that allow a trainee to practice safe usage of technology-assisted driving (e.g., using navigation systems (e.g., GPS) while parked; integrating images in back-up cameras with images from over viewpoints (e.g., through side mirrors, through rearview mirror, and/or through rear window); acclimating to blind spot indicators, lane-departure warnings, and electronic stability control mechanisms as driving aids rather than distractions. In one embodiment, In-Vehicle Warning Systems Activity 1204 comprises an assessment of the cognitive load increase introduced by an in-vehicle alarm/warning system. In this embodiment, one or more interactive simulation activities comprise increased cognitive load for a trainee by introducing an in-vehicle alarm/warning component to visual awareness, gap analysis and/or hazard detection simulations (described elsewhere herein) in order to train proactive and reactive driver responses (to and during warning alarms) that disarm the warning signals (e.g., by positioning the vehicle safely out of danger). In other embodiments, In-Vehicle Warning Systems Activity 1204 involves visual and auditory recognition and memory of tones and signals so that a trainee is less distracted when the warning signals are presented during the simulation. In yet another embodiment, In-Vehicle Warning Systems Activity 1204 involves targeted neurocognitive training to enhance visual awareness and take action to mitigate the immediate hazard that triggered the warning signal The simulated driving scenarios are similar to those discussed elsewhere herein (e.g., as discussed with reference to Oncoming Gap Activity 1003), and as with other simulated driving scenarios, a trainee is asked to "drive" in the simulation while attending to everything going on around him such as where other vehicles and/or pedestrians are. For In-Vehicle Warning Systems Activity 1204, however, the trainee is additionally tasked with identifying various warning indicators/signals and/or correcting the cause of the warning indicators/signals. For example, during a simulated driving scenario, one or more auditory and/or visual impending collision alert(s) can be triggered (e.g., a blind spot indicator light illuminates, and/or an auditory beeping begins) which become(s) more intense over a period of time (e.g., 3 second). The trainee is tasked with identifying the cause of the alert (e.g., a pedestrian behind the vehicle as the trainee reverses the vehicle) and reacting appropriately to disarm the alert (e.g., by braking).

In some embodiments, intensity of the trainee's cognitive load is varied (see, e.g., D. Strayer et al. (October 2014), "Measuring Cognitive Distraction in the Automobile II: Assessing In-Vehicle Voice-Based Interactive Technologies, AAA Foundation for Traffic Safety" for standardized rankings of some distractions) as In-Vehicle Warning Systems Activity 1204 progresses. In some embodiments, a trainee is presented with distractions of varying cognitive load based on a cognitive load taxonomy (e.g., eating, grooming, texting, or navigating complex menus or imperfect voice recognition systems while engaged in a driving simulation) while multiple hazards and/or objects appear and/or disappear throughout the simulation. Varying the intensity of the trainee's cognitive load serves two purposes: to acclimate a trainee to warning indicators/signals so as to desensitize the trainee to the "startle" impact of the in-vehicle alarms so that the trainee can react more quickly to address the cause of the warning in a real-world environment; and to sensitize a trainee to the cognitive loads (and consequential increased probability of collision) imposed by various distractions. Intensity of a trainee's cognitive load can be manipulated by varying the intensity of a warning indicator (e.g., a steady light indicator such as a blind spot indicator, a light flashing with increased frequency as a hazard becomes more imminent, an auditory beeping sound which increases in pitch or intensity as a hazard becomes more imminent, etc.), as well as by varying the cognitive load of the distraction itself (e.g., listening to verbal navigation directions, composing of an email, texting, etc.).

In some embodiments of Vehicle Warning Systems Activities 1204, the level of cognitive distraction is assessed across specific levels (e.g., by using a six-point scale progressing from no distraction, progressing through low distraction level 1 (e.g., changing channels on the radio), through increasing distraction levels 2 (e.g., talking on cell phone), 3 (e.g., texting), and 4 (e.g., navigating complex menus and instructions) to high distraction Level 5 (e.g., use of imperfect voice recognition applications like Apple Inc.'s current SIRI application or General Motor's large screen Internet displays for the driver). When a distraction ends, the driving scene (advanced through the period of time of the distraction) is again visible, thereby allowing a trainee to evaluate his performance and increased crash risk after experiencing simulated warnings for the various types of distractions with varying intensities of cognitive load.

In an exemplar simulated driving scenario, a trainee—in the midst of listening to directions to a destination using an imperfect voice recognition application such as Apple Inc.'s SIRI—is presented with a lane departure alarm. The trainee is tasked with recognizing the lane departure warning and then taking appropriate action (e.g., move left, move right, slow down, speed up, stop, etc.) such as taught in Escape Route Activity 1105 (described elsewhere herein). Thus, the scenario requires that a trainee (1) immediately identify a warning signal as a lane departure warning signal, and (2) react appropriately to the lane departure warning. After completion of the exercise, the trainee evaluates how different warning alarms and types of distraction impacted his safety performance (e.g., by being shown what he missed as a result of a warning signal distraction and distracted driving behavior).

In another embodiment, the trainee is tasked with backing up the simulated motor vehicle while identifying vehicles and/or objects and/or pedestrians as they become relevant (e.g., by becoming a hazard or being endangered). Again, the purpose of the activity is to immediately identify collision alert warning signals and react accordingly. As the trainee works on this task during the simulated driving scenario, however, auditory and/or visual impending collision alerts are triggered (e.g., a blind spot indicator light illuminates, or an auditory beeping begins) and become more intense over a period of time (e.g., 3 second). In one embodiment, when a distraction ends, the driving scene, advanced through the distraction period of time is again visible, such that a trainee would see an imminent hazard (e.g., a pedestrian behind the vehicle) which the trainee has not avoided. In one embodiment, after completion of the activity, the trainee evaluates how different warning alarms and types of distraction impact safety performance (e.g., by being shown what he missed as a result of the warning signal distraction and distracted driving behavior).

In one embodiment, if a trainee has not successfully addressed the impending collision in an activity (e.g., by not steering around a potential hazard, or by not braking, etc.) before the collision warning is terminated, a narrator explains how much time has elapsed and how the driving situation has changed (e.g., who/what the trainee has hit). A trainee is then provided with an opportunity to try the driving scenario again without impending collision alerts to see what transpired during the visual distraction. In a preferred embodiment, once a predetermined sufficient number of simulated driving scenarios have been completed, the trainee can proceed to the next activity.

In various embodiments, visual, auditory, or visual and auditory signals are presented as warning signals within simulated driving scenarios. In various embodiments, a trainee is instructed in identification of specific warning signals used in his personal vehicle. In other embodiments, since different auto manufacturers have different visuals, tones, and functionalities associated with their own brand of warning systems, a trainee is instructed in identification of specific warning signals used in a variety of different vehicles.

Module Review 1205 comprises a written review of critical information presented within Technology Enriched Driving Module 1200, including, in one embodiment: information about how technological advances provide safety protections within a vehicle; cautionary information about limitations of these technological advances; and suggestions about how to properly use embedded technology to increase the probability of avoiding a collision.

Quiz 1206 comprises a multiple choice quiz to assess comprehension of crucial information presented during Technology Enriched Driving Module 1200. In one embodiment, multiple choice questions are drawn (with or without replacement) from a database of relevant multiple choice questions. In one embodiment, a trainee must pass 75% of the questions in order to proceed to another module.

Review Certification Questions 1207 comprises possible key points presented during Technology Enriched Driving Module 1200 that may be encountered on a multiple choice certification exam and/or psychometric assessment using driving simulations, both designed to assess understanding and acquisition of critical crash-avoidance skills at the conclusion of the training program.

Figure 13:
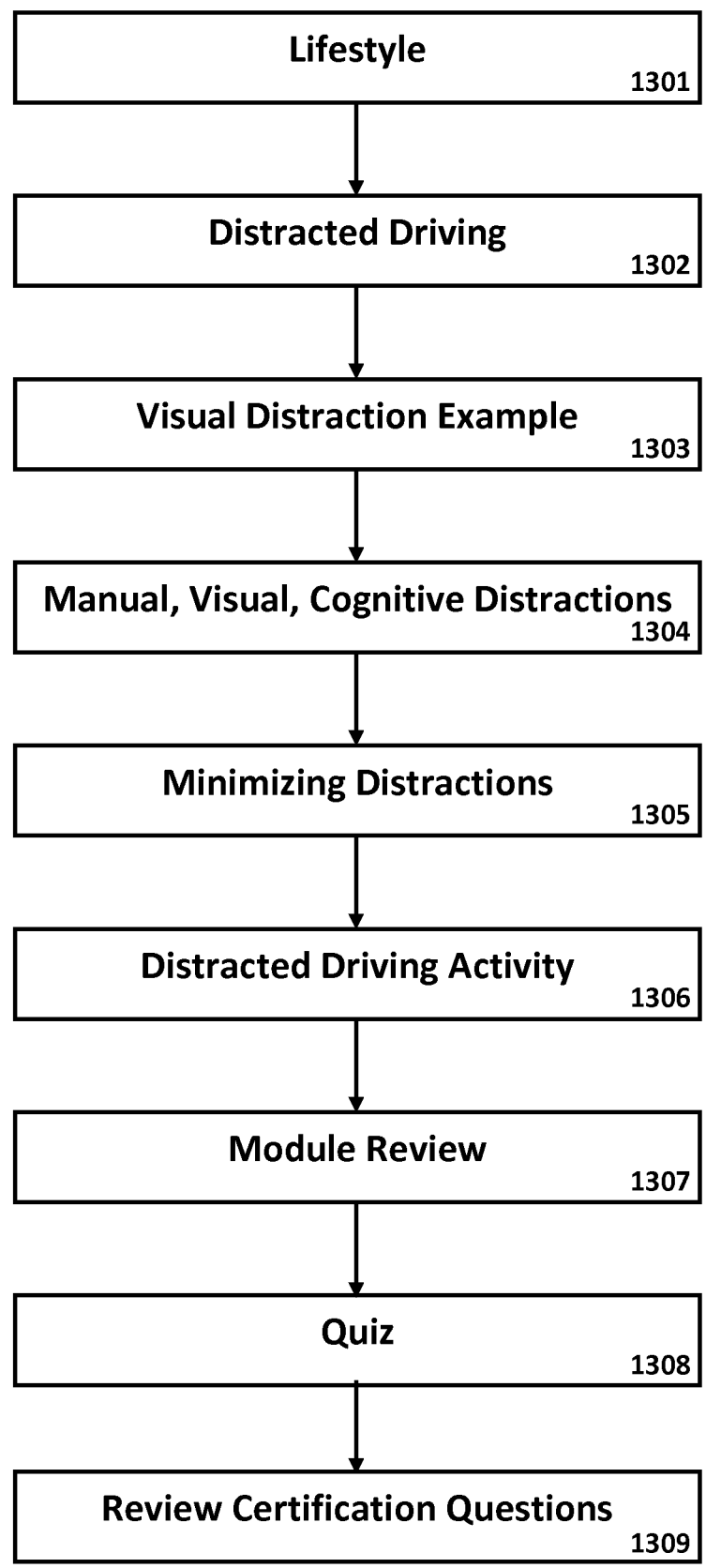
FIG. 13 is a flow diagram depicting a module for teaching about lifestyle and distracted driving issues according to one embodiment.

Referring now to FIGS. 2 and 13, typical activities during a Lifestyle and Distracted Driving Module 1300 according to one embodiment are shown. In Lifestyle and Distracted Driving Module 1300, a trainee is provided information about how lifestyle issues impact driving habits and skills. Lifestyle 1301 comprises an audiovisual presentation used to inform and instruct a trainee about how lifestyle issues such as time management (e.g., leaving late for an appointment), stress (e.g., work stress), risk-taking activities (e.g., smoking, drinking, drug use), peer pressure (e.g., driving with multiple passengers, decisions to engage in distracted driving (e.g., driving with multiple passengers, playing with stereo, using a phone, texting) can impact driving performance. The goal of Lifestyle 1301 is to inform trainees about risks so they can make better, safer decisions about potentially risky behavior. In some embodiments, Lifestyle and Distracted Driving Module 1300 comprises an audiovisual presentation used to inform and instruct a trainee about how technological advances provide safety protections within a vehicle (e.g., seat belts, advanced frontal airbags, advanced side airbags and curtains, steering controls, etc.), as well as limitations of those technological advances (e.g., seat belts and air bags save lives, but can cause serious injuries (e.g., if safety belt load limits are exceeded or passenger seat load requirements are not met for deployment of passenger airbags).

Distracted Driving 1302 comprises an audiovisual presentation designed to educate trainees about why inexperienced drivers are especially vulnerable to distractions (e.g., smaller distractions have a disproportionally larger impact simply because a driver is inexperienced), and why current cultural needs to constantly stay in touch (which place high priority on texting and phone use) lead to distracted driving.

Visual Distraction Example 1303 comprises an audiovisual presentation illustrating how visual distractions affect a driver's abilities to see and react to changes in a driving environment. Visual Distraction Example 1303 is designed to emphasize why visual distractions (i.e., distractions when a driver's eyes are off the road, e.g., when a driver is looking at dashboard, looking at passenger, fiddling with the stereo, checking out the GPS navigation system, or texting) are dangerous and to illustrate how dangerous such visual distractions can be. In one embodiment, Visual Distraction Example 1303 comprises statistics demonstrating the dangers of cell phone use while driving (e.g., that 21% of all accidents are caused by cell phone use while driving, that, for teens; that an even a greater percentage (30%) of accidents are caused by cell phone use because they tend to talk more frequently and for longer periods of time than adults; that someone speaking on a phone while driving is four times as likely to crash as someone who is driving and not talking on a phone; and that the estimated crash risk for texting and driving ranges from 8 to 23 times higher than driving without texting; that texting while driving is 2-5 time more risky than driving drunk; teen distracted driving fatalities are on the rise; and that 60% of rear-end collisions are caused by talking on the phone or texting) and that cell phone use is so dangerous because multi-tasking is a myth. In a preferred embodiment, Visual Distraction Example 1303 additionally comprises actual video footage, animated illustration, and/or other graphic illustration showing how a visual distraction (e.g., glancing down at a cell phone while texting) for an approximately 3 seconds doubles reaction time and doubles reaction distance as the brain processes the changes in the visual environment that happened during the glance down. Visual Distraction Example 1303 can additionally comprise graphic illustration that a vehicle traveling at a high rate of speed (e.g., 60 m.ph.) can travel a great distance (e.g., 264 feet) during a 3 second lapse due to visual distraction.

Manual, Visual and Cognitive Distractions 1304 comprises an audiovisual presentation illustrating how manual distractions (i.e., when a driver's hands are off the steering wheel, e.g., sending a text message, handing something to someone, putting something onto the backseat), visual distractions (i.e., when the drivers eyes are off the road), and cognitive distractions (i.e., when a driver's mind is occupied with something other than driving, e.g., composing a text message, listening to someone, or answering a question when on a cell phone, trying to remember if a song the driver wants to play is saved under "Driving Mix 1" or "Road Trip tunes", or thinking about something a driver's friend said that really upset the driver) affect a driver's abilities to see and react to changes in a driving environment. In one embodiment, Manual, Visual and Cognitive Distractions 1304 comprises statistics demonstrating the dangers of manual, visual, and cognitive distractions (e.g., that picking up a French fry that fell on the floorboard can multiply a crash risk up to nine times; that taking your eyes off the road at 60 m.p.h. for three seconds results in traveling the length of a football field totally unaware of changing traffic conditions) are a leading cause of rear end collisions and spinal injuries; And that cognitive distraction result in "inattention blindness" which can decrease a driver's visual perception because the parietal lobe of the brain shuts down by approximately 40% and redirects cognitive energy to the temporal lobes associated with language).

In one embodiment, Manual, Visual, and Cognitive Distractions 1304 further comprises an audiovisual presentation about cognitive load to explain why reaction times slow with cognitive distractions, including examples of how cognitive loads increases negatively impact driving (e.g., using hands-free devices to talk or text increases a driver's cognitive load and doubles reaction time; talking on a phone or texting while driving reduces a driver's field of view by as much as 50%, which causes a 50% reduction in the ability to spot critical safety events and objects on a road). In various embodiments, potential problems caused by technology-assisted driving (e.g., use of navigation systems (e.g., Global Positioning Satellite (GPS)), back-up cameras, blind spot indicators, lane-departure warnings, electronic stability control mechanisms, safety belt load limits and pretension, advanced frontal airbags, advanced side airbags and curtains, steering controls, etc.) are presented.

Minimizing Distractions 1305 comprises an audiovisual presentation to emphasize strategies and behaviors to minimize distracted driving, including, for example, (1) focus on driving and leave stressors outside the vehicle (e.g., when running late, rather than speeding, park and call ahead to let someone know, and then drive at a safe speed to get to a destination); (2) keep the number of passengers in a vehicle to a minimum; (3) turn cell phone off so it will not be a distraction; and (4) set up audio players (e.g., stereo, iPod, mp3 player, etc.), GPS navigation, and other running devices before driving to avoid later distractions. In various embodiments, safe usage of technology-assisted driving tools (e.g., navigation systems (e.g., GPS), back-up cameras, blind spot indicators, lane-departure warnings, electronic stability control mechanisms, safety belt load limits and pretension, advanced frontal airbags, advanced side airbags and curtains, steering controls, etc.) is presented.

Distracted Driving Activity 1306 comprises one or more interactive simulation activities designed to heighten a trainee's ability to recognize safe escape routes and provide the trainee practice in reacting safely to sudden changes in traffic flow within various driving scenarios. In one embodiment, Distracted Driving Activity 1306 comprises one or more levels, each with two or more simulated driving scenarios. In some embodiments, a trainee must successfully complete a pre-established number of these simulated driving scenarios to progress to a new module. In various embodiments, Distracted Driving Activity 1306 comprises interactive simulation activities that allow a trainee to practice safe usage of technology-assisted driving (e.g., using navigation systems (e.g., GPS) while parked; integrating images in back-up cameras with images from over viewpoints (e.g., through side mirrors, through rearview mirror, and/or through rear window); acclimating to blind spot indicators, lane-departure warnings, and electronic stability control mechanisms as driving aids rather than distractions.

The simulated driving scenarios are similar to those discussed elsewhere herein (e.g., as discussed with reference to Oncoming Gap Activity 1003), and as with other simulated driving scenarios, a trainee is asked to "drive" in the simulation while attending to everything going on around him such as where other vehicles and/or pedestrians are. For Distracted Driving Activity 1306, the trainee is tasked with identifying vehicles as they become relevant to driving (e.g., by becoming a hazard). As the trainee works on this task during the simulated driving scenario, however, a visual distraction (e.g., an incoming text message) is presented which obstructs the driving scene for a period of time (e.g., 3 second). When the distraction ends, the driving scene, advanced through that period of time is again visible, such that a trainee would see an imminent hazard (e.g., a light that has changed to red and a vehicle how turning left immediately in front of the simulated vehicle) which the trainee has no time to avoid.

In one embodiment, after the visual distraction is terminated, a narrator explains how much time has elapsed and how the driving situation has changed. A trainee is then provided with an opportunity to try the driving scenario again without distractions to see what transpired during the visual distraction. In a preferred embodiment, once a predetermined sufficient number of simulated driving scenarios have been completed, the trainee can proceed to the next activity.

Module Review 1307 comprises a written review of critical information presented within Lifestyle and Distracted Driving Module 1300, including, in one embodiment: an identification of lifestyle issues that can increase the risk of a crash; information about how the identified lifestyle issues can increase the risk of a crash; suggestions about making better and safer risky decisions about lifestyle issues in order to decrease a risk of a crash; a definition of three types of distractions that occur while driving (visual, manual, and cognitive) along with an explanation of why minimizing these distractions is a critical skill for crash-avoidance.

Quiz 1308 comprises a multiple choice quiz to assess comprehension of crucial information presented during Lifestyle and Distracted Driving Module 1300. In one embodiment, multiple choice questions are drawn (with or without replacement) from a database of relevant multiple choice questions. In one embodiment, a trainee must pass 75% of the questions in order to proceed to another module.

Review Certification Questions 1309 comprises possible key points presented during Lifestyle and Distracted Driving Module 1300 that may be encountered on a multiple choice certification exam and/or psychometric assessment using driving simulations, both designed to assess understanding and acquisition of critical crash-avoidance skills at the conclusion of the training program.

In one embodiment, each module must be completed before a trainee is permitted to begin a next module. In various embodiments, a trainee may redo any or all modules. In a preferred embodiment, a training session is presented to a trainee as a series of modules which allow a trainee to progress at his chosen speed. In other embodiments, module may not be overtly circumscribed. That is, a trainee may not know that he is proceeding from one module to another. In some embodiments, modules and information contained within modules described herein may not be organized as described herein.

In one embodiment, a computerized certification test is administered to a trainee after completion of the training program. The certification test comprises multiple choice test questions and/or interactive driving scenario activities designed to assess understanding and acquisition of critical crash-avoidance skills taught in the training program. In one embodiment, questions are drawn from a bank of questions. A trainee's results are displayed on computing device 1501 or audiovisual display 1502 following completion of the certification test. In one embodiment, the results comprise a display of areas of strength and areas of weakness for which improvement is recommended. In one embodiment, results of multiple choice questions and driving scenarios are presented independently.

In one embodiment, recorded performance during training on each critical crash-avoidance skill is also displayed using data stored in the database. For each critical crash-avoidance skill, data stored in the database is used to calculate a score for each critical crash-avoidance skill. A passing score for a critical crash-avoidance skill can be indicated by the crash-avoidance skill being listed as a strength. A score below passing causes the crash-avoidance skill to be listed as a weakness which needs improvement and tips for improvement are provided.

If a trainee passes the certification test, results of the certification test can be forwarded to a third party such as an insurance agency, a state motor vehicle agency, a police department, or an automotive association (e.g., AAA).

The disclosed method has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, training and practice can be provided by presenting training modules to trainees in an order different from that described herein for preferred embodiments. Or, training in critical crash-avoidance skills can be provided by presenting information detailed within modules described herein organized in non-modular form instead.

Further, it should also be appreciated that the described method can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of training a motor vehicle operator in crash-avoidance driving skills, the method comprising the steps of:
    a) presenting to the motor vehicle operator by one or more audiovisual device a training session designed to teach crash-avoidance driving skills to the motor vehicle operator, wherein
        i. the training session comprises multiple modules focused on critical driving skills;
        ii. at least one module comprises one or more interactive driving simulation presented through multiple active visual zones comprising visual zones corresponding to three active mirrors and a windshield view of a four camera point of view driving simulation by simultaneously displaying through each of the multiple active visual zones a scene recorded from multiple fields of view; and
        iii. at least one of the interactive driving simulations comprises presenting a visual distraction which obstructs the driving simulation for a period of time and then presenting the driving simulation advanced through the period of time;
    b) creating by the computing device a database for storing performance of the motor vehicle operator;
    c) recording by a computing device performance of the motor vehicle operator in response to one or more events during each of the one or more interactive driving simulations of the training session;
    d) storing by the computing device in the created database the recorded performance of the motor vehicle operator in response to each of the one or more events during each of the one or more interactive driving simulations of the training session; and
    e) analyzing by the computing device the stored performance of the motor vehicle operator from at least one of the one or more interactive driving simulations of the training session to assess acquisition of the critical driving skills.

2. The method of claim 1 wherein the critical driving skills comprise
    a) actively scanning a driving environment to identify, recognize, and remember what is seen;
    b) adjusting vehicle speed and position to accommodate road conditions, visibility, and traffic;
    c) proactively identifying and responding to potential hazards before the potential hazards become immediate hazards;
    d) recognizing, assessing, and responding to driving risks;
    e) creating a space cushion in order to identify and maintain possible escape routes; and
    f) identifying and minimizing visual, manual, and cognitive distractions.

3. The method of claim 1 wherein performance comprises reactions, accuracy, or reaction times of the motor vehicle operator.

4. The method of claim 1 further comprising repeating steps a), c), d), and e) to assess improvement in the driving skills of the motor vehicle operator.

5. The method of claim 1 further comprising f) comparing the stored performance of the motor vehicle operator from at least one of the one or more interactive driving simulations of the training session to a database of normalized performance comprising stored performance from multiple motor vehicle operators to further assess acquisition of critical driving skills.

6. The method of claim 1 further comprising providing information regarding successful completion of the training to a third party.

7. The method of claim 6 wherein the third party is an insurance agency, a state motor vehicle agency, a police department, or an automotive association.

8. The method of claim 1 wherein computer-based training is provided by the computing device to supplement the training session designed to teach crash-avoidance driving skills to the motor vehicle operator.

9. The method of claim 1 wherein at least one of the one or more interactive driving simulations is presented using digital frame-based technology.

10. The method of claim 1 wherein at least one of the one or more interactive driving simulations comprises a targeted neurocognitive psychometric driving simulation.

11. The method of claim 1 wherein at least one of the one or more audiovisual devices is a computing device.

12. The method of claim 1 wherein the visual distraction is selected from the group consisting of receiving a text message, using a navigation system, using an internet browser, emailing, and using social media.

13. The method of claim 1 wherein the visual distraction is a technology-assisted driving tool.

14. The method of claim 13 wherein the technology-assisted driving tool is selected from the group consisting of a back-up camera, a blind spot indicator, a collision-avoidance warning, a collision-avoidance auto-correct feature, a lane-departure warning, a lane-departure auto-correct feature, and an electronic stability control mechanism.

15. A system for training a motor vehicle operator in crash-avoidance driving skills, the system comprising:
  a. one or more audiovisual device configured to present to the motor vehicle operator a training session designed to teach crash-avoidance driving skills to the motor vehicle operator, wherein
    i. the training session comprises multiple modules focused on critical driving skills;
    ii. at least one module comprises one or more interactive driving simulations presented through multiple active visual zones comprising visual zones corresponding to three active mirrors and a windshield view of a four camera point of view driving simulation by simultaneously displaying through each of the multiple active visual zones a scene recorded from multiple fields of view; and
    iii. at least one of the interactive driving simulations comprises presenting a visual distraction which obstructs the driving simulation for a period of time and then presenting the driving simulation advanced through the period of time; and
  b. a computing device configured to
    i. create a database for storing performance of the motor vehicle operator;
    ii. record performance of the motor vehicle operator in response to one or more events during each of the one or more interactive driving simulations of the training session;
    iii. store in the created database the recorded performance of the motor vehicle operator during each of the one or more interactive driving simulations of the training session; and
    iv. analyze the stored performance of the motor vehicle operator in response to each of the one or more events from at least one of the one or more interactive driving simulations of the training session to assess acquisition of the critical driving skills.

16. The system of claim 15 wherein the critical driving skills comprise
  a) actively scanning a driving environment to identify, recognize, and remember what is seen;
  b) adjusting vehicle speed and position to accommodate road conditions, visibility, and traffic;
  c) proactively identifying and responding to potential hazards before the potential hazards become immediate hazards;
  d) recognizing, assessing, and responding to driving risks;
  e) creating a space cushion in order to identify and maintain possible escape routes; and
  f) identifying and minimizing visual, manual, and cognitive distractions.

17. The system of claim 15 wherein at least one of the one or more interactive driving simulations comprises a targeted neurocognitive psychometric driving simulation.

18. The system of claim 15 wherein the computing device is further configured to provide computer-based training to supplement the training session.

19. The system of claim 15 wherein at least one of the one or more audiovisual devices is a computing device.

20. The system of claim 15 wherein performance comprises reactions, accuracy, or reaction times of the motor vehicle operator.

21. A non-transitory computing device readable medium having stored thereupon computing instructions for training a motor vehicle operator in crash-avoidance driving skills, the computing instructions comprising:
  a) a code segment to present to the motor vehicle operator by one or more audiovisual device a training session designed to teach crash-avoidance driving skills to the motor vehicle operator, wherein
    i. the training session comprises multiple modules focused on critical driving skills;
    ii. at least one module comprises one or more interactive driving simulations presented through multiple active visual zones comprising visual zones corresponding to three active mirrors and a windshield view of a four camera point of view driving simulation by simultaneously displaying through each of the multiple active visual zones a scene recorded from multiple fields of view; and
    iii. at least one of the interactive driving simulations comprises presenting a visual distraction which obstructs the driving simulation for a period of time and then presenting the driving simulation advanced through the period of time; and
  b) a code segment to create by the computing device a database for storing performance of the motor vehicle operator;
  c) a code segment to record by a computing device performance of the motor vehicle operator in response to one or more events during each of the one or more interactive driving simulations of the training session;

d) a code segment to store by the computing device in the created database the recorded performance of the motor vehicle operator in response to each of the one or more events during each of the one or more interactive driving simulations of the training session; and e) a code segment to analyze by the computing device the stored performance of the motor vehicle operator in response to each of the one or more events from at least one of the one or more interactive driving simulations of the training session to assess acquisition of the critical driving skills.

22. The non-transitory computing device readable medium of claim 21 having stored thereupon computing instructions for training a motor vehicle operator in crash-avoidance driving skills wherein the critical driving skills comprise a) actively scanning a driving environment to identify, recognize, and remember what is seen;

b) adjusting vehicle speed and position to accommodate road conditions, visibility, and traffic;

c) proactively identifying and responding to potential hazards before the potential hazards become immediate hazards;

d) recognizing, assessing, and responding to driving risks;

e) creating a space cushion in order to identify and maintain possible escape routes; and f) identifying and minimizing visual, manual, and cognitive distractions.

* * * * *